(12) United States Patent
Goebel et al.

(10) Patent No.: US 8,168,083 B2
(45) Date of Patent: May 1, 2012

(54) ELECTRO-OPTICAL LIGHT CONTROL ELEMENT, ELECTRO-OPTICAL DISPLAY AND CONTROL MEDIUM

(75) Inventors: Mark Goebel, Darmstadt (DE); Markus Czanta, Darmstadt (DE)

(73) Assignee: Merck Patent Gesellschaft MIT Beschraenkter Haftung, Darmstadt (DE)

( * ) Notice: Subject to any disclaimer, the term of this patent is extended or adjusted under 35 U.S.C. 154(b) by 0 days.

(21) Appl. No.: 12/677,155

(22) PCT Filed: Aug. 26, 2008

(86) PCT No.: PCT/EP2008/006986
§ 371 (c)(1),
(2), (4) Date: Mar. 9, 2010

(87) PCT Pub. No.: WO2009/033564
PCT Pub. Date: Mar. 19, 2009

(65) Prior Publication Data
US 2010/0188630 A1  Jul. 29, 2010

(30) Foreign Application Priority Data
Sep. 10, 2007 (DE) .......................... 10 2007 042 674

(51) Int. Cl.
*C09K 19/00* (2006.01)
*C09K 19/06* (2006.01)
*C09K 19/32* (2006.01)
*C09K 19/52* (2006.01)

(52) U.S. Cl. ............ 252/299.6; 252/299.01; 252/299.61; 252/299.62; 252/299.63; 252/299.64; 252/299.65; 252/299.66; 252/299.67; 430/20; 428/1.1; 349/139; 349/167; 349/182

(58) Field of Classification Search ............. 252/299.01, 252/299.6–299.67; 349/167, 182, 139; 428/1.1; 430/20
See application file for complete search history.

(56) References Cited

U.S. PATENT DOCUMENTS
| | | | |
|---|---|---|---|
| 6,781,657 B1* | 8/2004 | Kim et al. ..................... | 349/129 |
| 2002/0047974 A1 | 4/2002 | Matsumoto et al. | |
| 2003/0053018 A1 | 3/2003 | Ono et al. | |
| 2003/0224125 A1 | 12/2003 | Heckmeier et al. | |
| 2007/0146603 A1 | 6/2007 | Uehara et al. | |
| 2010/0309398 A1* | 12/2010 | Klement et al. ................ | 349/33 |

FOREIGN PATENT DOCUMENTS
EP  1739151 A1 *  1/2007

OTHER PUBLICATIONS

International Search Report for PCT/EP2008/006986 dated Apr. 9, 2009.
Scharkowski, A. et al., "Elastic Constants of Nematic Phenylpyrimidines Determined by Two Different Methods," Z. Naturforsch, 1990, 45a, pp. 37-42.
Beyer, A. et al., "Physcial Properties of Liquid Crystals: VI. Elastic Constants," Merck Liquid Crystals, Nov. 1997, pp. 1-6.
Hong, Seung Ho et al., "Electro-Optic Characteristic of Fringe-Field Switching Mode Depending on Rubbing Directions," Jpn. J. Appl. Phys., 2000, vol. 39, pp. L527-L530.
Martin Schadt and Francis Müller, "Physical Properties of New Liquid-Crystal Mixtures and Electrooptical Performance in Twisted Nematic Displays", IEEE Transactions on Electron Devices, vol. Ed-25, No. 9, pp. 1125-1137 (1978).
Paul R. Gerber and Martin Schadt, "On the Measurement of Elastic Constants in Nematic Liquid Crystals: Comparison of Different Methods", Z. Naturforsch. 35a, pp. 1036-1044 (1980).
M. Schadt and P.R. Gerber, "Class Specific Physical Properties of Liquid Crystals and Correlations with Molecular Structure and Static Electrooptical Performance in Twist Cells", Z. Naturforsch. 37a, pp. 165-178 (1982).
Ludwig Pohl and Ulrich Finkenzeller, "Physical Properties of Liquid Crystals", in Birendra Bahadur (ed.), "Liquid Crystals, Applications and Uses", vol. 1, World Scientific Publishing, Singapore, pp. 136-169 (1990).

* cited by examiner

*Primary Examiner* — Geraldina Visconti
(74) *Attorney, Agent, or Firm* — Millen, White, Zelano & Branigan, P.C.

(57) ABSTRACT

The present invention relates to an electro-optical light-modulation element of the FFS type, and to electro-optical displays and display systems, such as, for example, television screens and computer monitors, which contain elements of this type. The light-modulation elements according to the invention contain a liquid-crystalline modulation medium which has optimised elastic constants and are distinguished, in particular, by high contrast and/or optimised transmission in addition to good contrast, a low viewing-angle dependence, short response times and low addressing voltages. The present invention likewise relates to the liquid-crystalline modulation media used in the electro-optical light-modulation elements.

19 Claims, No Drawings

ELECTRO-OPTICAL LIGHT CONTROL ELEMENT, ELECTRO-OPTICAL DISPLAY AND CONTROL MEDIUM

AREA OF THE INVENTION

The present invention relates to light-modulation elements, in particular of the FFS type, to displays which contain these light-modulation elements, and to the liquid-crystalline modulation media used in these light-modulation elements.

The present invention relates to an electro-optical light-modulation element and to electro-optical displays and display systems containing such elements, such as, for example, television screens, mobile-telephone displays and computer monitors. The light-modulation elements according to the invention are, in particular, those of the FFS type and preferably contain a liquid-crystalline modulation medium, particularly preferably a nematic modulation medium, which is preferably distinguished by large elastic constants.

Besides low viewing-angle dependence and good colour fidelity, the light-modulation elements according to the invention are characterised, in particular, by low working voltages.

The present invention furthermore relates to a method for increasing the contrast of light-modulation elements, in particular of the FFS type, for use in displays through the use of liquid-crystalline modulation media having optimised elastic properties.

OBJECT AND PRIOR ART

Conventional electro-optical liquid-crystal displays are generally known. The most widespread are TN ("twisted nematic") and STN ("super twisted nematic") displays. The liquid-crystal cells of these displays have electrodes on the substrates on the two sides of the liquid-crystal medium opposite one another. The electric field is thus essentially vertical to the liquid-crystal layer. The first-mentioned displays in particular are used in combination with TFT ("thin film transistor") addressing for displays having a large information content and high resolution, for example in laptop and notebook computers.

In order to improve the viewing-angle dependence, modifications of the above-mentioned display types have been introduced, in particular displays having compensation films for use, for example, in desktop computer monitors and television screens.

Liquid-crystal displays of the VAN ("vertically aligned nematic") type have likewise increasingly been used recently primarily for improving the viewing-angle dependence. VAN displays are a variant of the ECB ("electrically controlled birefringence") displays. In a modern variant of the MVA ("multi-domain vertically aligned nematic") displays, a plurality of domains are stabilised per addressed electrode, and in addition a special optical compensation layer is used. Like the TN and STN displays already mentioned, these displays use an electric field which is essentially vertical to the liquid-crystal layer.

Another display type which has been proposed for improving the viewing-angle dependence is the IPS ("in-plane switching") displays (see, for example, DE 40 00 451 and EP 0 588 568). In contrast to the displays already mentioned, these generally use electrodes on only one substrate, i.e. on one side of the liquid-crystal layer. These electrodes are also known as interdigital electrodes. These displays are characterised in that the electric field has a significant component parallel to the liquid-crystal layer. This twists the liquid crystals of the modulation layer out of a usually untwisted homogeneous, virtually planar initial alignment in the plane of the display. This results in excellent, low viewing-angle dependence of the contrast and particularly colour reproduction.

In the IPS displays employed in practice, the comb-shaped parts of the electrode structures are intermeshed with one another and are preferably located in at least two different planes, which are in turn preferably separated from one another by a solid dielectric. They are charged with different electrical potentials, i.e. are electrically addressed, causing an electric field having a significant component in the planes of the display or in the plane of the liquid-crystal layer to be produced. This component of the electric field in the plane of the liquid-crystal layer results in the director of the dielectrically anisotropic liquid crystals being twisted essentially in the plane of the liquid-crystal layer.

In the displays of the IPS type, the liquid-crystal layer essentially switches only in the region between the interdigital electrodes and virtually not at all over electrodes themselves. This either reduces the contrast or, for example on use of a black mask (BM) for masking the non-switching regions, the aperture ratio and thus the transmission or brightness of the display.

In the recent past, electro-optical liquid-crystal displays of the FFS ("fringe-field switching") type have been proposed (for example Lee, S. H., Lee, S. L. and Kim, H. Y., Proc. of the 18$^{th}$ Int. Display Research Conf., 1998, pp. 371 ff, and Jung, S. H., Kim, H. Y., Song, S. H., Kim, J.-H., Nam, S.-H., and Lee, S. H., Jpn. J. Appl. Phys., Volume 43, No. 3, 2004, pp. 1028-1031 and literature cited therein). These displays have also already been implemented commercially (Lee, S. H. et al., SID Dig., 2001, pp. 484 ff). Like the likewise known liquid-crystal displays of the IPS type which have in the recent past increasingly been employed, in particular, in desktop computer monitors and in television sets, they typically have a comb-shaped/comb-like electrode structure on one side of the liquid-crystalline modulation medium.

In contrast to the electrode configurations used in the IPS displays described above, the electrodes in FFS displays consist, however, of an individual structured, slotted electrode (pixel electrode) and a counter-electrode (CE, also known as "common electrode"). (The slotted electrode, the pixel electrode, is occasionally also known as comb-shaped or ladder-shaped electrode and its structures essentially parallel to one another are correspondingly known as teeth or rungs). Like the electrodes of the IPS displays, these two electrodes are both located on the same substrate and thus on one side of the liquid-crystal layer. In contrast to IPS displays, however, only one of the two electrodes in FFS displays is designed as a structured (comb-shaped) electrode and the other electrode is an unstructured, conductive layer which generally masks the predominant part of the area of the light-modulation element or even the entire area of the light-modulation element. The structured electrode here is referred to as the pixel electrode and the other, unstructured electrode is referred to as the counterelectrode. As in IPS displays, the two electrodes are separated from one another by a layer of an insulating material, typically a dielectric.

The thickness of this insulation layer is typically 500 nm to 800 nm. The preferred insulation material is usually $SiO_2$ or $SiN_X$.

In FFS displays, the oblong structured parts, i.e. the individual "teeth" or "rungs", of the pixel electrodes are generally at a separation ("l") from one another which is somewhat larger both than their width ("w") and also the layer thickness of the modulation medium of the light-modulation element ("d"). Typical values are about l=5 µm, w=3 µm and d=3 µm to 4 µm.

In contrast to conventional IPS displays, FFS displays require a greater optical retardation (d·Δn). d·Δn here is typically in the range from 0.30 µm to 0.50 µm. According to Jung, S. H., Kim, H. Y., Song, S. H., Kim, J.-H., Nam, S.-H., and Lee, S. H., Jpn. J. Appl. Phys., Volume 43, No. 3, 2004, pp. 1028-1031, d·Δn for FFS displays is preferably 0.36 µm or more, particularly preferably often about 0.42 µm, whereas, for example, according to Satake, T., Nishioka, T., Saito, T. and Kurata, T., Jpn. J. Appl. Phys., Volume 40, 2001, pp. 195 ff, this value for IPS displays is preferably 343.8 nm, i.e. significantly lower than the value for most FFS displays.

FFS displays have the same good viewing-angle range as IPS displays. Since, however, the liquid-crystalline modulation medium in them also switches in the regions above the electrodes, they have significantly greater transmission and thus better brightness without an additional loss of contrast (Lee, S. H., Lee, S. L. and Kim, H. Y., Appl. Phys. Lett., 1998, Volume 73, No. 20, p. 2881).

In FFS mode, the liquid-crystal director of dielectrically positive liquid-crystal media executes both a twist and also a tilt movement as a reaction to the electric field ("fringe field").

FFS displays which use dielectrically negative liquid crystals as modulation media have significantly higher transmission than those which use dielectrically positive liquid crystals. They are thus preferred in this respect. However, they require significantly greater operating voltages than the FFS displays containing dielectrically positive liquid crystals since the absolute value of the dielectric anisotropy in dielectrically positive liquid crystals can adopt significantly greater values than in dielectrically negative liquid crystals (Lee, S. H., Lee, S. L. and Kim, H. Y., Appl. Phys. Lett., 1998, Volume 73, No. 20, p. 2881).

In addition, the alignment angle (α) and the fluctuation of the director in FFS displays which use dielectrically positive liquid crystals as modulation media have a significant influence on the transmission, which is not the case in FFS displays containing dielectrically negative liquid crystals (Hong, S. H., Park, I. C., Kim, H. Y. and Lee, S. E., Jpn. J. Appl. Phys., Volume 39, 2000, pp. L527-L530). This means that FFS displays containing dielectrically positive liquid crystals generally have worse transmission than those containing dielectrically negative liquid crystals.

There is thus a demand for dielectrically positive liquid crystals as modulation media for light-modulation elements of the FFS type which enable, in particular, higher transmission without at the same time impairing the other applicationally relevant properties, such as, for example, good viewing-angle dependence and the lowest possible addressing voltages.

These light-modulation elements should have the smallest possible layer thickness of the modulation media in order to be usable as elements of FPDs ("flat panel displays"), such as, for example, flat screens for computers, for example for multimedia applications. Furthermore, they should be addressable by means of a simple electrode configuration and have a relatively low operating voltage. In addition, they should, for use in electro-optical displays, have good contrast with low viewing-angle dependence.

PRESENT INVENTION

Surprisingly, it has been found that light-modulation elements which have
   an electrode arrangement comprising
      a structured electrode which has two or more structures which are essentially parallel to one another and are insulated from one another over a significant proportion of their length and
      a counterelectrode which extends essentially over the entire active area of the light-modulation element;
   and which can preferably generate an electric field having
      a significant component both parallel to the surface of the liquid-crystalline modulation medium and also perpendicular thereto,
   preferably an element for the polarisation of light or a plurality of elements for the polarisation of light, and
   a liquid-crystalline modulation medium,
characterised in that the liquid-crystalline modulation medium has
   an elastic constant $K_1$ of 14.0 pN or more than 14.0 pN, preferably of 15.0 pN or more than 15.0 pN and very particularly preferably of 16.0 pN or more than 16.0 pN,
enable excellent displays to be achieved.

In particular, the contrast of these displays and the viewing-angle dependence thereof are excellent. Their response times are short. The transmission and thus the brightness of these displays are significantly better than in comparable displays, and the addressing voltages are relatively low.

The electric field used is preferably a fringe field.

The present invention furthermore relates to a liquid-crystalline modulation medium for use in FFS light-modulation elements.

The present application furthermore relates to a process for improving the properties of FFS light-modulation elements, in particular through the use of liquid-crystalline modulation media having optimised viscosities and/or dielectric anisotropies and/or elastic constants, in particular having optimised elastic constants.

Surprisingly, it has been found that an increase in the values of the elastic constants for splay of the liquid-crystal director ($K_1$) and for bend of the liquid-crystal director ($K_3$) increases the black state of FFS light-modulation elements and thus improves their contrast. In addition, it has been found that a higher $K_1$ results in better maximum transmission and a reduction in the working voltage.

By contrast, the size of the elastic constant for twist of the liquid-crystal director ($K_2$) has a significant influence on the electro-optical characteristic lines of the FFS light-modulation elements. Smaller values of $K_2$ result both in a reduction in the characteristic voltages of the electro-optical characteristic line and in an increase in the maximum transmission of the light-modulation elements.

Both $K_1$ and $K_2$ influence the response time of FFS light-modulation elements. Larger values of the corresponding elastic constants result in shorter response times, with the effect being significantly more pronounced in the case of $K_2$ than in the case of $K_1$. For the elastic constant $K_3$, an effect of this type on the response times has not been observed.

The liquid-crystalline media according to the invention preferably have the largest possible values of the elastic constants $K_1$ and $K_3$. A simultaneous moderate increase in $K_2$ can have a favourable effect on the response times.

The preferred embodiments are explained in greater detail below.

An increase in $K_1$ has the most favourable influence on the display properties since the working voltage is not changed and the contrast ratio is improved.

The improvement in the transmission of the FFS light-modulation elements according to the invention is achieved on the one hand, in particular, by optimisation of $K_1$. The value of $K_1$ of the media according to the invention for FFS light-modulation elements having improved response time/transmission is preferably 14.0 pN or more to 30.0 pN or less.

$K_1$ of the media according to the invention for FFS light-modulation elements having improved properties is preferably 14.0 pN or more to 30.0 pN or less, particularly preferably 14.5 pN or more to 25 pN or less and very particularly preferably 15.0 pN or more to 20 pN or less.

The improvement in the transmission of the FFS light-modulation elements according to the invention is achieved on the other hand, in particular, by optimisation of $K_2$. Here too, large values are preferred.

However, $K_2$ should preferably also not become too large since otherwise the characteristic voltages of the electro-optical characteristic line and thus the operating voltage of the FFS light-modulation elements increase too much.

The value of $K_2$ of the media according to the invention for FFS light-modulation elements having improved transmission is preferably 2.0 pN or more to 20.0 pN or less, particularly preferably 3.0 pN or more to 18.0 pN or less and very particularly preferably 4.0 pN or more to 16.0 pN or less.

In a particularly preferred embodiment, the value of $K_2$ of the media according to the invention for FFS light-modulation elements having improved response time/transmission is preferably 3.0 pN or more to 15.0 pN or less, particularly preferably 4.0 pN or more to 10.0 pN or less and very particularly preferably 5.0 pN or more to 7.0 pN or less.

Very particularly preferably, $K_1$ of the media according to the invention is 14.0 pN or more than 14.0 pN and at the same time $K_2$ of the media according to the invention is 7.0 pN or less than 7.0 pN.

$K_3$ of the media according to the invention for FFS light-modulation elements having improved properties is preferably 8.0 pN or more to 30.0 pN or less, particularly preferably 10.0 pN or more to 28.0 pN or less and very particularly preferably 12.0 pN or more to 26.0 pN or less.

In particular, the ratios of the elastic constants $K_2/K_3$ and in particular $K_2/K_1$ have a significant influence on the properties of the FFS light-modulation elements according to the invention.

The ratio $K_2/K_1$ here is preferably 0.10 or more to 1.0 or less, particularly preferably 0.20 or more to 0.8 or less and very particularly preferably 0.3 or more to 0.5 or less.

The ratio $K_2/K_3$ is preferably as high as possible. It is preferably 0.40 or more and particularly preferably 0.60 or more.

The media according to the invention for FFS light-modulation elements having improved properties preferably have clearing points in the range from 70° C. or more to 120° C. or less, particularly preferably from 75° C. or more to 100° C. or less and very particularly preferably from 80° C. or more to 93° C. or less.

The nematic phase of the media according to the invention for FFS light-modulation elements having improved properties preferably extends over a temperature range of 80 degrees or more, particularly preferably 100 degrees and very particularly preferably 120 degrees or more.

The media according to the invention for FFS light-modulation elements having improved properties preferably have a nematic phase which extends over a temperature range from −20° C. or less to 70° C. or more, particularly preferably from −30° C. or less to 80° C. or more and very particularly preferably from −40° C. or less to 120° C. or more.

The media according to the invention for FFS light-modulation elements having improved properties preferably have rotational viscosities of 120 mPa·s or less, particularly preferably 110 mPa·s or less and very particularly preferably 100 mPa·s or less.

The media according to the invention for FFS light-modulation elements having improved properties preferably have a dielectric anisotropy in the range from 2.0 or more to 6.0 or less, particularly preferably from 2.5 or more to 14.0 or less and very particularly preferably from 3.0 or more to 12.0 or less.

The media according to the invention for FFS light-modulation elements having improved properties preferably have birefringence values in the range from 0.05 or more to 0.18 or less, particularly preferably from 0.06 or more to 0.17 or less and very particularly preferably from 0.07 or more to 0.16 or less.

The FFS light-modulation elements according to the invention having improved properties preferably have a layer thickness of the liquid-crystal layer (d) in the range from 1.0 μm or more to 7.0 μm or less, particularly preferably from 2.0 μm or more to 6.0 μm or less and very particularly preferably from 3.0 μm or more to 4.0 μm or less.

The FFS light-modulation elements according to the invention having improved properties preferably have optical retardation values (d·Δn) in the range from 0.3 μm or more to 0.5 μm or less, particularly preferably from 0.34 μm or more to 0.485 μm or less and very particularly preferably from 0.36 μm or more to 0.47 μm or less.

The FFS light-modulation elements according to the invention having improved properties preferably have an orientation angle or alignment angle (typically rubbing angle) (α) of the liquid-crystal director to the direction of the fringe field, i.e. perpendicular to the longitudinal elongation of the electrode rungs of the structured electrode, on a substrate, preferably on the substrate on which the structured electrode layer is located. This angle α is preferably in the range from 5° or more to 15° or less, particularly preferably from 9° or more to 15° or less and very particularly preferably from 11° or more to 13° or less and is in particular about 12°. The corresponding substrate is usually rubbed perpendicular to the edges and the electrode slots are produced at an angle α thereto.

The FFS light-modulation elements according to the invention having improved properties preferably have a tilt angle of the liquid-crystal director (Θ) in the rest state at least one, preferably at both substrates. This tilt angle is preferably small.

The FFS light-modulation elements according to the invention having improved properties preferably have a twist angle of the liquid-crystal director (φ) in the rest state over the layer thickness of the liquid-crystal layer from one substrate to the other either of about 0° or of about 90°.

The preferred medium used for investigating the mesogenic properties of compounds and components which do not have a mesophase is the nematic mixture ZLI-4792 from Merck KGaA, Darmstadt, Germany. The properties of the respective mesogenic compounds or components are preferably extrapolated from 10% solution in this mixture. If a solution of this type is not sufficiently stable in the nematic phase for the corresponding investigations, the concentration of the particular compound or component is halved until a sufficiently stable mixture is obtained.

The light-modulation elements according to the invention preferably contain a liquid-crystalline medium which is in the nematic phase at the operating temperature. This medium is advantageously located between two substrates, at least one of which transmits light. The light-transmitting substrate or the light-transmitting substrates may consist, for example, of glass, quartz or plastic. If a substrate which does not transmit light is used, this may consist, inter alia, of a metal or a semiconductor. These media can be used as such or can be located on a support, for example a ceramic. If the mesogenic medium is a polymeric medium, the use of a second substrate can optionally be omitted. Polymeric mesogenic media can even be produced in self-supporting form. In this case, the use of a substrate can optionally be omitted.

The light-modulation elements according to the invention contain an electrode structure which is suitable for the generation of an electric field having a significant component parallel to the liquid-crystal layer and a significant component perpendicular to the liquid-crystal layer.

This electrode structure can be produced in the form of interdigital electrodes. It can be produced, for example, in the form of combs or ladders (i.e. with one or more side rails and with rungs) or in the form of a surface with one or more slots, which may be open at one end. Designs in the form of mutually overlapping "H"s (for example "H—H" and double "T"s or "I"s (for example "I" ) are often also advantageous. The electrode structure is advantageously located on only one side of the liquid-crystalline medium, preferably between this substrate and the liquid-crystalline medium in the case of the use of at least one substrate. The electrode structure is preferably located in at least two different planes, both of which are located on one side of the mesogenic modulation medium, this applies in particular if the electrode structure contains overlapping part-structures. These part-structures are advantageously separated from one another by a dielectric layer. If the part-structures are located on the opposite sides of an insulation layer, a layout which allows the production of capacitors can be selected. This is particularly advantageous in the case of addressing of displays by means of an active matrix. Active-matrix displays of this type use a matrix of addressing elements assigned to the individual light-modulation elements with a non-linear current-voltage characteristic line, such as, for example, TFTs or MIM ("metal insulator metal") diodes.

The electrodes may consist of light-transmitting material, such as, for example, indium tin oxide (ITO). In this case, it may be advantageous and in some cases necessary to mask part or parts of the light-modulation element by means of a black mask. This allows, for example, areas of the light-modulation element in which the electric field is ineffective to be screened and the contrast thus to be improved. In addition, it can protect light-sensitive electronic components, such as, for example, certain TFTs, against irradiation.

At least one of the electrodes, preferably the counterelectrode, may, however, also consist of a material which does not transmit light, usually of metal. The use of a separate black mask may then be omitted if desired.

The operating-temperature range of the light-modulation elements according to the invention preferably encompasses the range from 10° C. or less to 40° C. or more, particularly preferably from 0° C. or less to 50° C. or more and especially preferably from −20° C. or less to 60° C. or more.

The operating-temperature range of the light-modulation elements according to the invention preferably extends over a range from 0° C. or less to 40° C. or more, particularly preferably from −20° C. or less to 80° C. or more and in particular preferably from −40° C. or less to 90° C. or more.

The light-modulation elements according to the invention contain at least one element for the polarisation of light. In addition, they preferably contain a further optical element. This further optical element is either a second element for the polarisation of light, a reflector or a transflector.

The optical elements are arranged in such a way that the light passes through at least one polarising element at least once on passage through the mesogenic medium of the light-modulation element, both before entry into the mesogenic medium and also after exit from the mesogenic medium.

In a preferred embodiment of the light-modulation element in accordance with the present invention, the mesogenic medium is located between two polarisers, i.e. a polariser and an analyser. It is preferred to use two linear polarisers. In this embodiment, the absorption axes of the polarisers are preferably crossed and preferably form an angle of 90°.

The light-modulation element according to the invention optionally contains one or more birefringent layers. It preferably contains one $\lambda/4$ layer or a plurality of $\lambda/4$ layers, preferably one $\lambda/4$ layer. The optical retardation of the $\lambda/4$ layer is preferably about 140 nm.

The light-modulation element according to the invention may additionally contain one or more further conventional optical elements, such as birefringent layers (for example compensation layers), diffuser layers and elements for increasing the brightness and/or the light yield, the viewing-angle dependence, where this list is not definitive.

The light-modulation elements according to the invention are characterised by good contrast.

The viewing-angle dependence of the contrast of the light-modulation elements according to the invention is very good. It is significantly better than that of known ECB cells. It is rather more comparable with commercially available IPS displays and MVA displays. It is much lower than that of the TN displays mentioned in the last paragraph. Thus, an isocontrast curve of a given contrast ratio for the light-modulation elements according to the invention generally includes an angle range which is more than twice as large, often even more than three times as large, as the corresponding isocontrast curve for the same contrast ratio in the TN display.

The response times of the light-modulation elements according to the invention are generally short.

In order to investigate the switching behaviour on addressing of grey shades, the light-modulation elements according to the invention are each switched, for example, from voltage $V_{10}$ to each of $V_{90}$, $V_{80}$, $V_{70}$ to $V_{20}$. The switch-on time is the time from switching on the new voltage to achieving 90% of the respective maximum transmission change for the particular switching processes.

Electro-optical displays in accordance with the present invention contain one or more light-modulation elements according to the invention. In a preferred embodiment, these are addressed by means of an active matrix.

In another preferred embodiment, the light-modulation elements according to the invention are addressed in so-called "field sequential mode". Here, the switching elements are illuminated successively with differently coloured light synchronously to the addressing. In order to produce pulsed coloured light, for example, a colour wheel, stroboscope lamps or flash lamps can be employed.

Electro-optical displays in accordance with the present invention can contain a coloured filter in order to display coloured images, in particular if they are used for television screens, computer monitors or the like. This coloured filter advantageously consists of a mosaic of filter elements of different colours. Typically here, an element of the coloured-filter mosaic of a colour is assigned to each electro-optical switching element.

The liquid-crystalline media in accordance with the present invention preferably have a nematic phase.

The clearing point of the mesogenic media having a nematic phase is preferably in the range from 60° C. to 120° C., particularly preferably in the range from 70° C. to 110° C. and very particularly preferably in the range from 70° C. to 90° C. In displays with backlighting, the clearing point is preferably in the range from 70° C. to 100° C. and particularly preferably in the range from 80° C. to 90° C.

The nematic phase is preferably stable down to −10° C., particularly preferably down to −30° C. and very particularly preferably down to −40° C.

For the light-modulation elements in accordance with the present invention, it is possible to use both mesogenic modulation media which have a positive dielectric anisotropy (Δ∈) in the nematic phase and those which have a negative dielectric anisotropy. Preference is given to the use of mesogenic modulation media which have a positive dielectric anisotropy in the mesophase.

The liquid-crystalline media in accordance with the present invention preferably consist of two to 40 compounds, particularly preferably five to 30 compounds and very particularly preferably seven to 25 compounds.

The liquid-crystalline media according to the invention having positive di-electric anisotropy preferably comprise
a component A consisting of one or more compounds having a strongly positive dielectric anisotropy of 10 or more, preferably 10 to 30,
optionally a component B consisting of one or more compounds having a moderately positive dielectric anisotropy of greater than 1.5 to less than 10,
optionally a component C consisting of one or more dielectrically neutral compounds having a dielectric anisotropy in the range from −1.5 or more to +1.5 or less, and
optionally a component D consisting of one or more compounds having a negative dielectric anisotropy of less than −1.5.

Component A of these media preferably comprises one or more compounds of the formula I and particularly preferably consists predominantly and very particularly preferably virtually completely of one or more compounds of the formula I

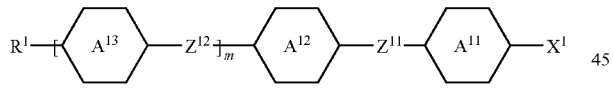

I in which
R¹ denotes alkyl or alkoxy, preferably n-alkyl or n-alkoxy, each having 1 to 7 C atoms, alkenyl, alkenyloxy, alkynyl or alkoxyalkyl, each having 2 to 7 C atoms,
one or more of the rings

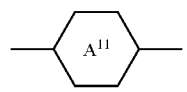

to

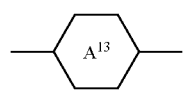

present denotes

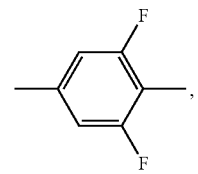

and the other rings

to

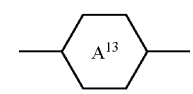

if present each, independently of one another and, if

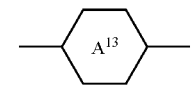

is present more than once, also these independently of one another, denote

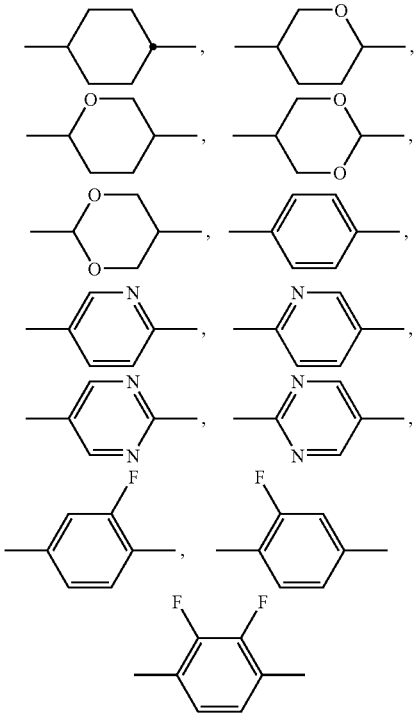

or preferably

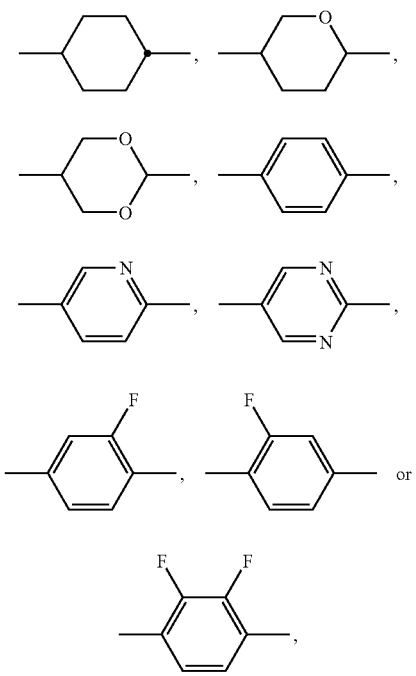

particularly preferably

denotes

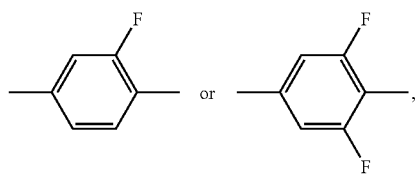

denotes

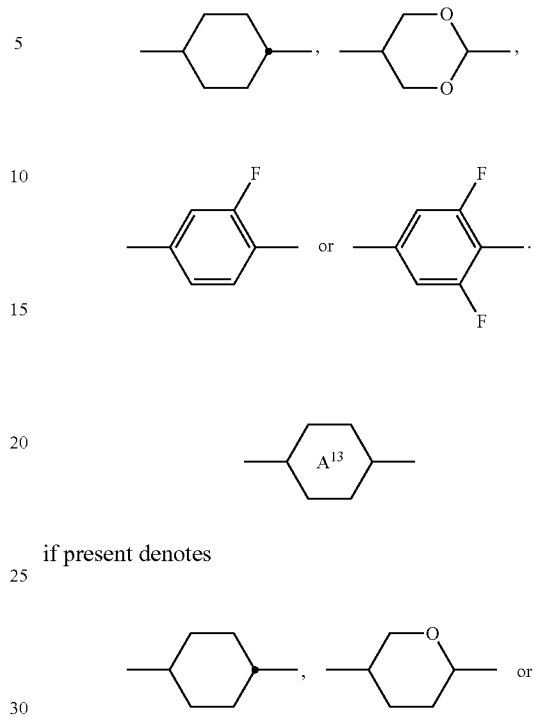

if present denotes

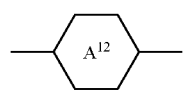

$Z^{11}$ and $Z^{12}$ if present each, independently of one another and, if $Z^{12}$ is present more than once, also these independently of one another, denote a single bond, —CO—O—, trans —CH=CH—, —CH=CF—, —CF=CH—, —CF=CF—, —CH=CH—CO—O—, —CF=CF—CO—O—, —CF=CH—CO—O—, —CH=CF—CO—O—, —CF$_2$—O—, —O—CF$_2$— or —C≡C—, preferably
$Z^{11}$ denotes a single bond or —CF$_2$—O— and
$Z^{12}$ denotes a single bond,
$X^1$ denotes F, Cl, —OCF$_3$, —CF$_3$, —OCF$_2$H, CN, —C≡C—CN or NCS, preferably F, —OCF$_3$, —CF$_3$, —OCF$_2$H or Cl, particularly preferably F, —OCF$_3$, or Cl, and very particularly preferably F or —OCF$_3$, and
m denotes 0, 1 or 2, preferably 0 or 1.

Component B of these media preferably comprises one or more compounds of the formula II and particularly preferably consists predominantly and very particularly preferably virtually completely of one or more compounds of the formula II

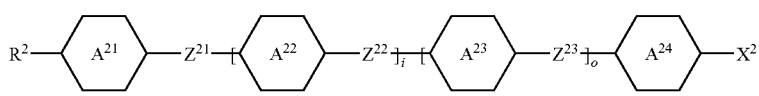

II in which

R$^{21}$ and R$^{22}$ each, independently of one another, denote H, an unsubstituted alkyl or alkenyl radical having up to 15 C atoms, where, in addition, one or more CH$_2$ groups in these radicals may be replaced by —O—, —S—,

—C≡C—, —CF$_2$—O—, —O—CF$_2$—, —CO—O— or —O—CO— in such a way that O atoms are not linked directly to one another, preferably an unsubstituted alkyl, alkenyl, alkoxy or alkenyloxy radical, particularly preferably one of R$^{21}$ and R$^{22}$ denotes an alkyl or alkenyl radical and the other denotes an alkyl, alkenyl, alkoxy or alkenyloxy radical, preferably, independently of one another, alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 1 to 5 C atoms, or alkoxyalkyl, alkenyl or alkenyloxy having 2 to 7 C atoms, preferably having 2 to 4 C atoms, preferably alkenyl, where one or more H atoms in all groups may be replaced by halogen atoms, preferably F atoms, particularly preferably one of R$^{21}$ and R$^{22}$, preferably R$^{11}$, denotes an alkyl or alkenyl radical and the other denotes an alkyl, alkenyl, alkoxy or alkenyloxy radical, particularly preferably R$^{21}$ denotes straight-chain alkyl, in particular CH$_3$—, C$_2$H$_5$—, n-C$_3$H$_7$—, n-C$_4$H$_9$— or n-C$_5$H$_{11}$—, or alkenyl, in particular CH$_2$=CH—, E-CH$_3$—CH=CH—, CH$_2$=CH—CH$_2$—CH$_2$—, E-CH$_3$—CH=CH—CH$_2$—CH$_2$— or E-n-C$_3$H$_7$—CH=CH—,

to

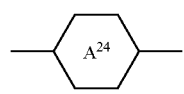

if present each, independently of one another, denote

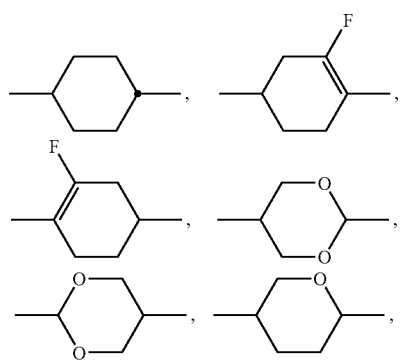

preferably

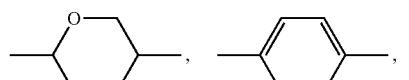
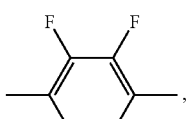

particularly preferably

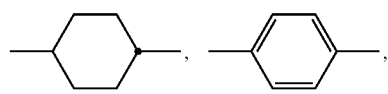

denotes

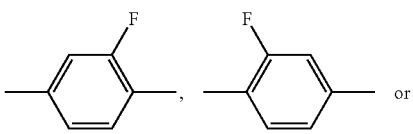
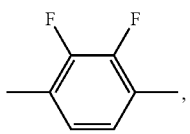

and

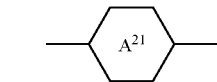

denotes

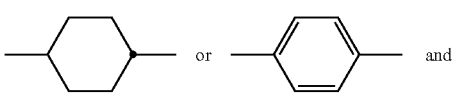

denotes

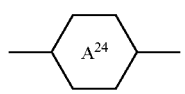

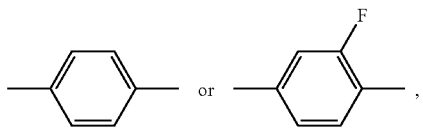

$X^2$ denotes F, Cl, —OCF$_3$, —OCHF$_2$, —CF$_3$, —CH$_2$F, —CHF$_2$, preferably F, Cl, —CF$_3$ or —OCF$_3$, particularly preferably F, $Z^{21}$ to $Z^{23}$ if present each, independently of one another, denote a single bond, —CH$_2$—CH$_2$—, —CH$_2$—CF$_2$—, —CF$_2$—CH$_2$—, —CF$_2$—CF$_2$—, —CH=CH—, —CF=CH—, —CH=CF—, —C≡C—, —CH$_2$—O—, —O—CH$_2$—, —O—, —CH$_2$—, —CO—O—, —O—CO—, —CF$_2$—O— or —O—CF$_2$—, preferably a single bond, —CH$_2$—CH$_2$—, —CH=CH—, —C≡C—, —CF$_2$—O— or —O—CF$_2$—, particularly preferably one or, if present, more of $Z^{21}$ to $Z^{23}$ denote a single bond, and very particularly preferably all denote a single bond, l and o each, independently of one another, denote 0 or 1, and (l+o) preferably denotes 0 or 1.

Component C of these media preferably comprises one or more compounds of the formula III and particularly preferably consists predominantly and very particularly preferably virtually completely of one or more compounds of the formula III

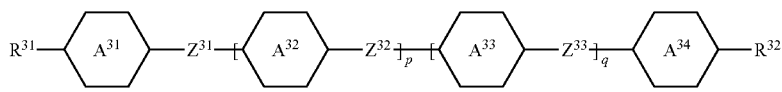

III in which $R^{31}$ and $R^{32}$ each, independently of one another, have one of the meanings given for $R^{11}$ and $R^{12}$ and preferably denote alkyl having 1 to 7 C atoms, preferably n-alkyl and particularly preferably n-alkyl having 1 to 5 C atoms, alkoxy having 1 to 7 C atoms, preferably n-alkoxy and particularly preferably n-alkoxy having 2 to 5 C atoms, or alkoxyalkyl, alkenyl or alkenyloxy having 2 to 7 C atoms, preferably having 2 to 4 C atoms, preferably alkenyloxy,

to

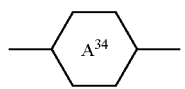

each, independently of one another, denote voneinander,

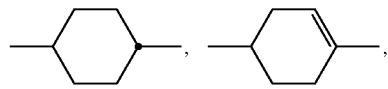

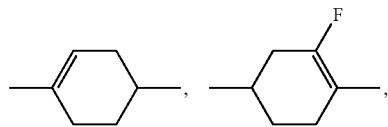

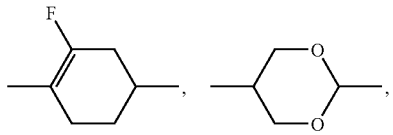

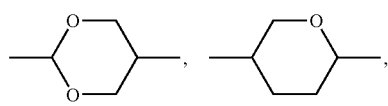

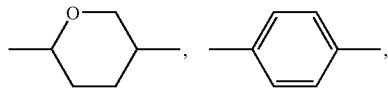

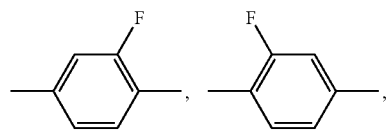

-continued

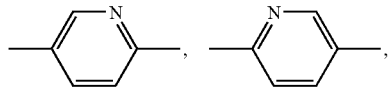

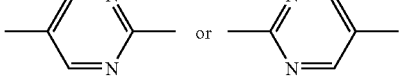

preferably

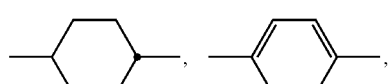

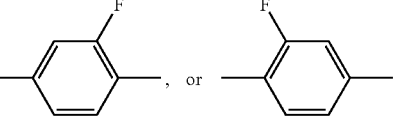

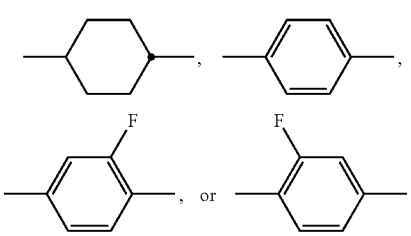

preferably

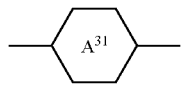

denotes

preferably

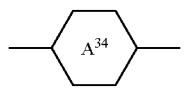

denotes

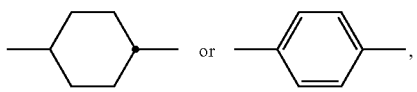

and, if present, preferably

denotes

$Z^{31}$ to $Z^{33}$ each, independently of one another, have one of the meanings given for $Z^{11}$ to $Z^{13}$ and preferably denote —CH$_2$—CH$_2$—, —CH=CH—, —C≡C—, —COO— or a single bond, preferably —CH$_2$—CH$_2$— or a single bond and particularly preferably a single bond, p and q each, independently of one another, denote 0 or 1, (p+q) preferably denotes 0 or 1, preferably 0.

The media according to the invention preferably comprise one or more compounds selected from the group of the compounds of the formulae I-1 to I-5:

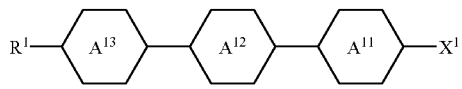

I-1

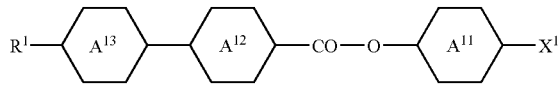

I-2

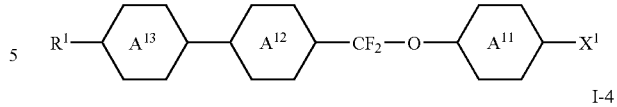

I-3

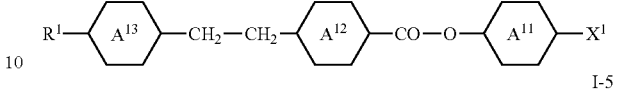

I-4

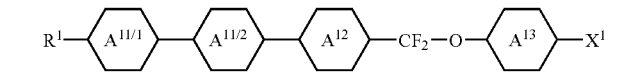

I-5 in which the parameters have the respective meanings given above under formula I.

The media according to the invention particularly preferably comprise one or more compounds selected from the group of the compounds of the formulae I-1 to I-5 in which $X^1$ denotes F and $R^1$ denotes $C_nH_{2n+1}$ and n denotes 1 to 7, preferably 1 to 5.

The media according to the invention very particularly preferably comprise one or more compounds selected from the group of the compounds of the following formulae I-1a to I-3b:

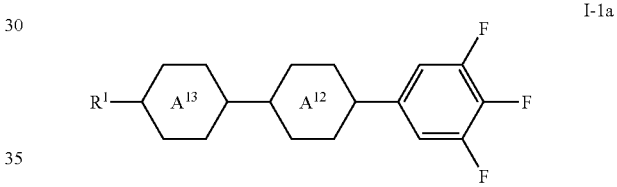

I-1a

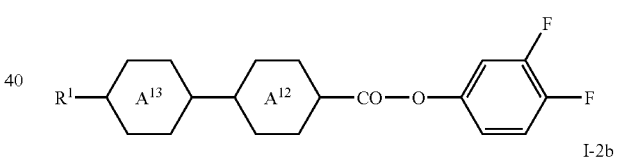

I-2a

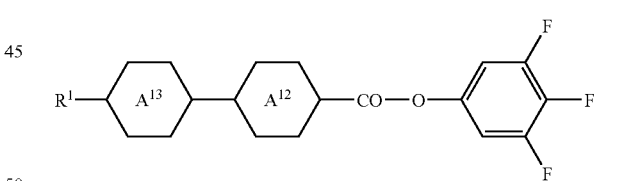

I-2b

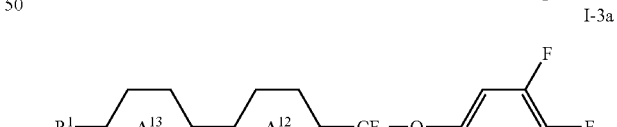

I-3a

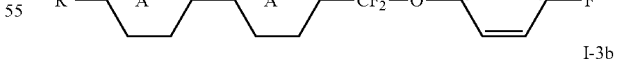

I-3b

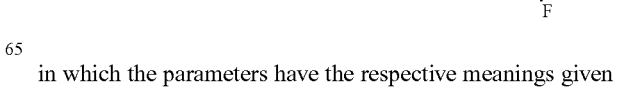

in which the parameters have the respective meanings given above under formula I.

The media according to the invention especially preferably comprise one or more compounds selected from the group of the compounds of the following formulae I-1a-1 to I-3b-2:

I-1a-1
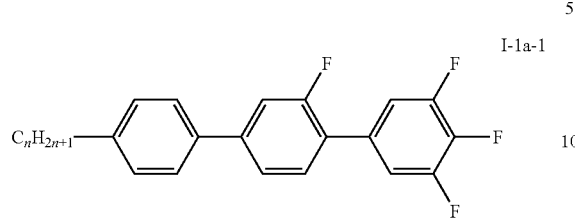

I-3b-1
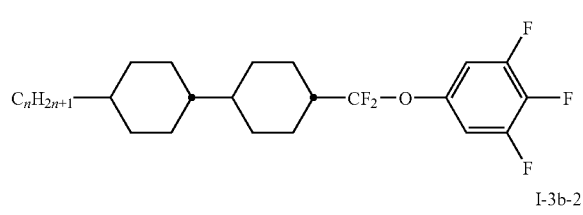

I-3b-2
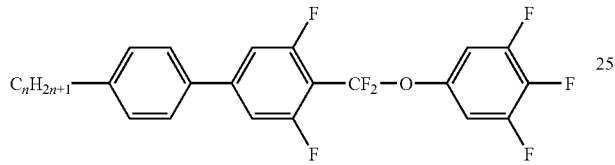

in which n denotes an integer from 0 to 7, preferably from 0 to 5 and particularly preferably from 1 to 5.

In a preferred embodiment, the medium comprises one or more compounds of the formula II selected from the group of the compounds of the formulae II-1 to II-8, preferably selected from the group of the compounds of the formulae II-2, II-4, II-6 and II-7:

II-1
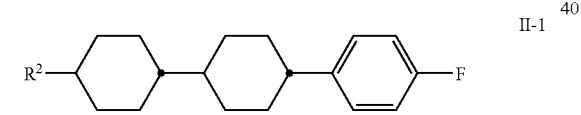

II-2
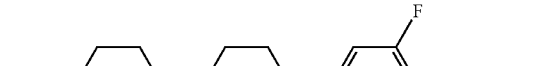

II-3
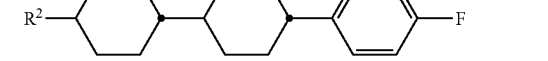

II-4
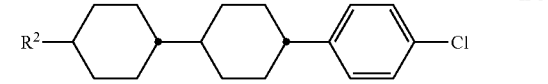

II-5
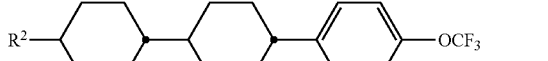

II-6
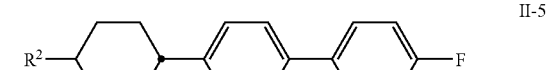

II-7
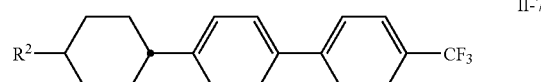

II-8
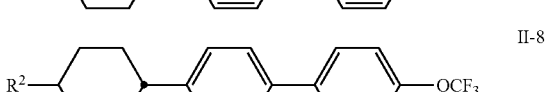

in which $R^2$ has the meaning indicated above and preferably denotes alkyl, particularly preferably n-alkyl having 1 to 5 C atoms or, particularly preferably in the case of formula II-2, alkenyl, preferably 1-E-alkenyl having 2 to 5 C atoms.

In a further preferred embodiment, the medium comprises one or more compounds of the formula III from the group of the compounds of the formulae III-1 to III-11, preferably selected from the group of the compounds of the formulae III-1 to III-9, preferably from the group III-1 to III-6 and particularly preferably from the group III-1 and III-4, III-1
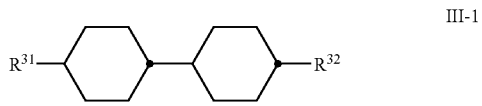

III-2

III-3

III-4
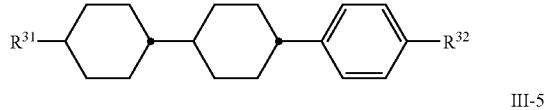

III-5
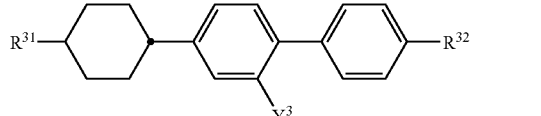

III-6
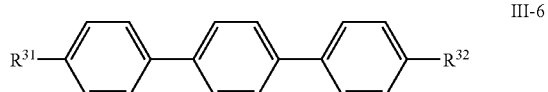

III-7
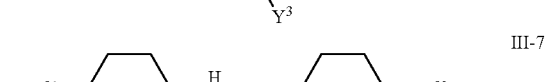

III-8
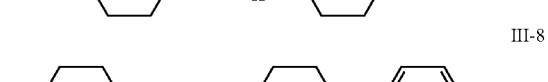

III-9
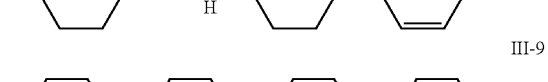

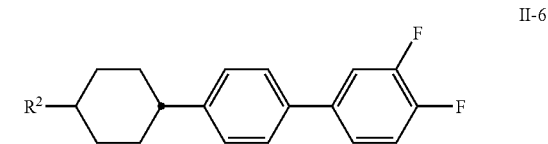

-continued

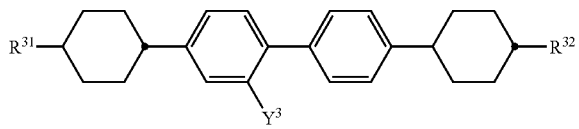
III-10

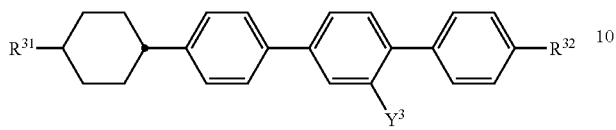
III-11 in which the parameters have the respective meanings given above for formula III, and
$Y^3$ denotes H or F and preferably
$R^{31}$ denotes alkyl or alkenyl and
$R^{32}$ denotes alkyl, alkenyl or alkoxy, preferably alkyl or alkenyl, particularly preferably alkenyl.

The medium particularly preferably comprises one or more compound(s) of the formula III-1, selected from the group
of the formula III-1c, especially preferably
of the formula III-1 in which $R^{31}$ denotes vinyl or 1-propenyl and $R^{32}$ denotes alkyl, preferably n-alkyl, particularly preferably $R^{31}$ denotes vinyl and $R^{32}$ denotes propyl, and
of the formula III-1d, especially preferably
of the formula III-1 in which $R^{31}$ and $R^{32}$, independently of one another, denote vinyl or 1-propenyl, preferably $R^{31}$ denotes vinyl and particularly preferably $R^{31}$ and $R^{32}$ denote vinyl.

In a further preferred embodiment, the medium comprises one or more compounds of the formula III-1, selected from the group of the compounds of the formulae III-1a to III-1e, preferably of the formulae III-1a and/or III-1c and/or III-1d, particularly preferably of the formulae III-1c and/or III-1d and very particularly preferably of the formula III-1c and the formula III-1d,

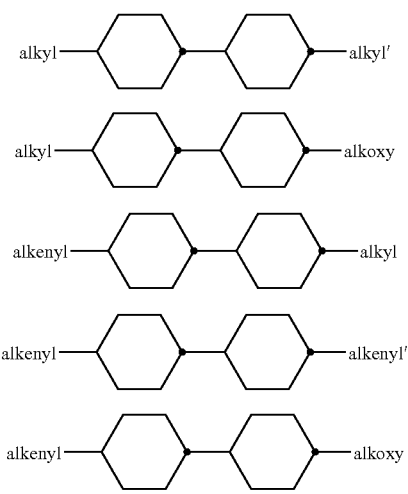

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl and alkenyl', independently of one another, denote alkenyl having 2 to 7 C atoms, preferably having 2 to 5 C atoms.

The medium according to the invention particularly preferably comprises compounds of the formula III-1 in amounts of 20% by weight or more, in particular 25% by weight or more, very particularly preferably 30% by weight or more, in particular compounds of the formula III-1a'

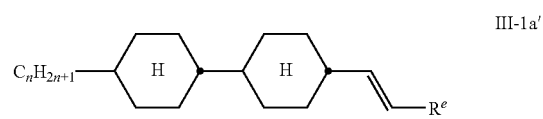
III-1a' in which
n denotes 3, 4, 5 and $R^e$ denotes H or $CH_3$.

In a further preferred embodiment, the medium comprises one or more compounds of the formula III-2, selected from the group of the compounds of the formulae III-2a to III-2d, preferably of the formulae III-2a and/or III-2b, particularly preferably of the formula III-2b,

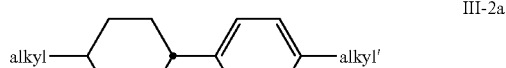
III-2a

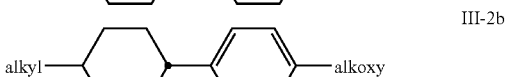
III-2b

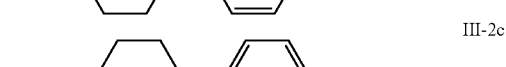
III-2c

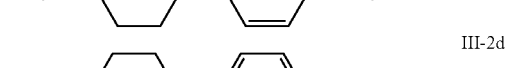
III-2d in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula III-3, selected from the group of the compounds of the formulae III-3a to III-3c:

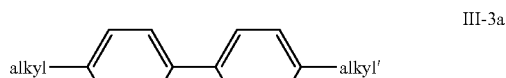
III-3a

III-3b

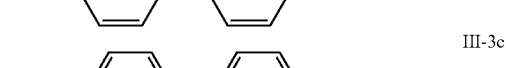
III-3c in which alkyl and alkyl', independently of one another, denote alkyl having 1 to 7 C atoms, preferably having 2 to 5 C atoms, alkenyl denotes alkenyl having 2 to 7 C atoms, preferably having 2 to 5 C atoms.

The proportion of these biphenyls in the mixture as a whole is preferably 3% by weight or more, in particular 5% by weight or more.

Preferred compounds of the formulae III-3a and III-3b are the compounds of the following formulae:

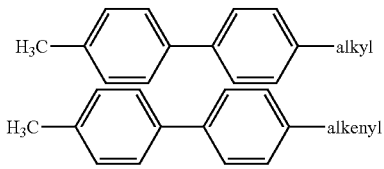

in which the parameters have the meanings given above.

Particularly preferred compounds of the formula III-3b are the compounds of the following formulae:

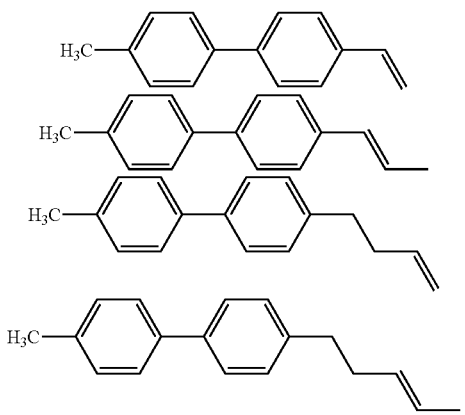

and of these in particular the compounds of the last formula.

In a preferred embodiment, the medium comprises one or more compounds of the formula III-4, particularly preferably one or more compound(s) in which $R^{31}$ denotes vinyl or 1-propenyl and $R^{32}$ denotes alkyl, preferably n-alkyl, particularly preferably $R^{31}$ denotes vinyl and $R^{32}$ denotes methyl.

In a further preferred embodiment, the medium comprises one or more compounds of the formula III-4, selected from the group of the compounds of the formulae III-4a to III-4d, preferably of the formulae III-4a and/or III-4b, particularly preferably of the formula III-4b, III-4a

III-4b

-continued

III-4c

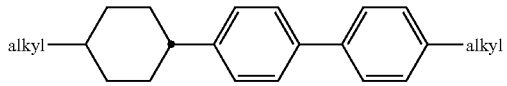

III-4d

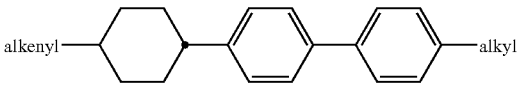

in which alkyl and alkyl', independently of one another, denote alkyl having 1 to 7 C atoms, preferably having 2 to 5 C atoms, alkoxy denotes alkoxy having to 1 to 5 C atoms, preferably having 2 to 4 C atoms, and alkenyl denotes alkenyl having 2 to 7 C atoms, preferably having 2 to 5 C atoms.

in a preferred embodiment, the medium comprises one or more compounds of the formula III-5, particularly preferably one or more compound(s) in which $R^{31}$ denotes alkyl, vinyl or 1-propenyl and $R^{32}$ denotes alkyl, preferably n-alkyl.

In a further preferred embodiment, the medium comprises one or more compounds of the formula III-5 selected from the group of the compounds of the formulae III-5a to III-5d, preferably of the formula III-5a and/or III-5b, particularly preferably of the formula III-5a, III-5a

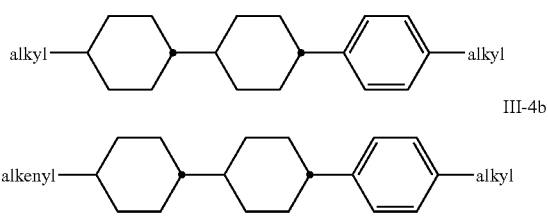

III-5b

III-5c

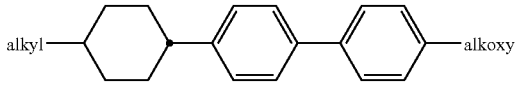

III-5d

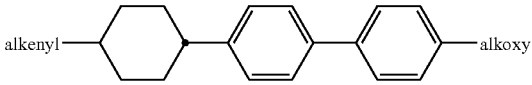

in which alkyl and alkyl', independently of one another, denote alkyl having 1 to 7 C atoms, preferably having 2 to 5 C atoms, alkoxy denotes alkoxy having to 1 to 5 C atoms, preferably having 2 to 4 C atoms, and alkenyl denotes alkenyl having 2 to 7 C atoms, preferably having 2 to 5 C atoms, and/or of the formulae III-5e to III-5h, preferably of the formulae III-5e and/or III-5f, particularly preferably of the formula III-5e,

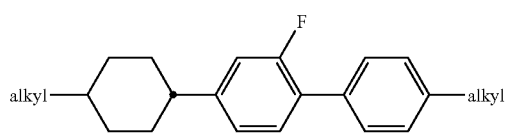

III-5e

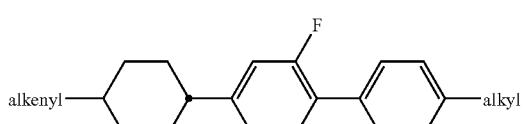

III-5f

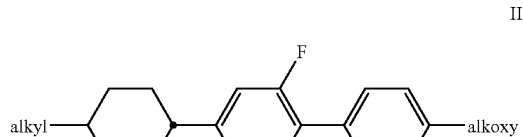

III-5g

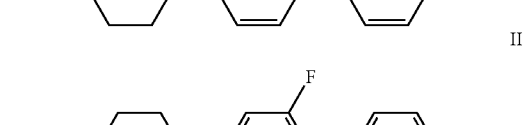

III-5h in which
alkyl and alkyl', independently of one another, denote alkyl having 1 to 7 C atoms, preferably having 2 to 5 C atoms,
alkoxy denotes alkoxy having to 1 to 5 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula III-6 selected from the group of the compounds of the formulae III-6a to III-6c, preferably of the formulae III-6a and/or III-6b, particularly preferably of the formula III-6a,

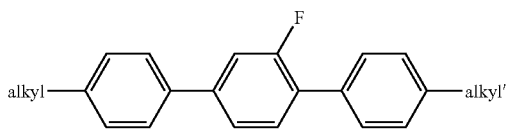

III-6a

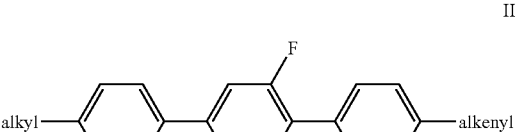

III-6b

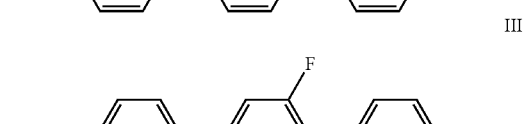

III-6c in which
alkyl and alkyl', independently of one another, denote alkyl having 1 to 7 C atoms, preferably having 2 to 5 C atoms, and
alkoxy denotes alkoxy having to 1 to 5 C atoms, preferably having 2 to 4 C atoms.

In a further preferred embodiment, the medium comprises one or more compounds of the formula III-6 selected from the group of the compounds of the formulae III-10a and III-10b

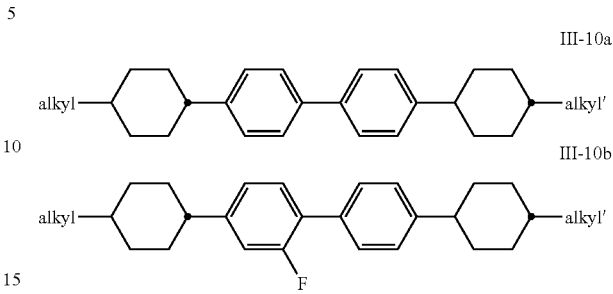

III-10a

III-10b in which
alkyl and alkyl', independently of one another, denote alkyl having 1 to 7 C atoms, preferably having 2 to 5 C atoms.

In a further preferred embodiment, the medium comprises one or more compounds of the formula III-11 selected from the compounds of the formula III-11a

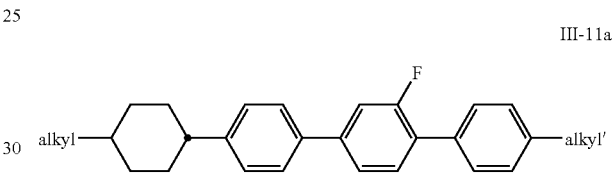

III-11a in which
alkyl and alkyl', independently of one another, denote alkyl having 1 to 7 C atoms, preferably having 2 to 5 C atoms.

The following table shows some examples of compounds of the particularly preferred formulae which are particularly suitable for the preparation of media according to the invention.

The liquid-crystalline media of positive dielectric anisotropy in accordance with the present invention particularly preferably consist predominantly and very particularly preferably virtually completely of components A to D, particularly preferably of components A to C.

In a preferred embodiment, the liquid-crystalline media of positive dielectric anisotropy in accordance with the present invention comprise one or more components selected from the group of components B to D, preferably selected from the group of components B and C.

The mesogenic medium in accordance with the present invention may comprise further additives and chiral dopants in conventional concentrations. The total concentration of these further constituents is in the range from 0% to 10%, preferably in the range from 0.1% to 6%, based on the mixture as a whole. The concentrations of the individual compounds of these are in the range from 0.1% to 3%. The concentration of these compounds and similar constituents of the mixture are not taken into account when indicating the concentration ranges of the other mixture constituents.

The media are obtained from the compounds in a conventional manner. The compounds employed in smaller amount are advantageously dissolved in the compounds employed in larger amount. If the temperature during the mixing operation is raised above the clearing point of the predominant component, the completeness of dissolution can easily be observed. However, the media according to the invention can also be prepared in other ways, for example through the use of premixes. Premixes which can be employed are, inter alia, homologue mixtures and/or eutectic mixtures. However, the premixes may also be mixtures which are themselves already suitable for use. This is the case in the case of so-called two-bottle or multibottle systems.

In the present application, the following applies, unless explicitly indicated otherwise.

Dielectrically positive compounds have a $\Delta\varepsilon > 1.5$, dielectrically neutral compounds have $\Delta\varepsilon$ in the range $-1.5 \leq \Delta\varepsilon \leq 1.5$ and dielectrically negative compounds have a $\Delta\varepsilon < -1.5$. The same definitions also apply to components of mixtures and to mixtures.

The dielectric anisotropy $\Delta\varepsilon$ of the compounds is determined at 1 kHz and 20° C. by extrapolation of the values of a 10% solution of the respective compound in a host mixture to a proportion of the respective compound of 100%. The capacitances of the test mixtures are determined both in a cell with homeotropic edge alignment and also in a cell with homogeneous edge alignment. The layer thickness of the two cell types is about 20 μm. For the measurement, a rectangular wave having a frequency of 1 kHz and an effective voltage (rms, "root mean square") of typically 0.2 V to 1.0 V is used. In each case, the voltage used is lower than the capacitive threshold of the mixture investigated in each case.

The host mixture used for dielectrically positive compounds is nematic liquid-crystal mixture ZLI-4792, and that used for dielectrically neutral and dielectrically negative compounds nematic liquid-crystal mixture ZLI-3086, both from Merck KGaA, Germany.

In the present application, the term threshold voltage denotes the optical threshold and is indicated for a relative contrast of 10% ($V_{10}$). The mid-grey voltage and the saturation voltage are likewise determined optically and are indicated for a relative contrast of 50% and 90% respectively. If the capacitive threshold ($V_0$), also known as the Freedericks threshold, is meant, this is indicated explicitly.

The indicated ranges of values preferably include the limit values, unless indicated otherwise.

The concentrations are given in % by weight and relate to the complete mixture. Temperatures are indicated in degrees Celsius and temperature differences in differential degrees Celsius.

All physical properties were determined as indicated in "Merck Liquid Crystals, Physical Properties of Liquid Crystals", Status November 1997, Merck KGaA, Germany, and are indicated for a temperature of 20° C.

The elastic constants are determined in accordance with Chapter VI of the above-mentioned brochure by means of deformation of the liquid crystals from three different initial alignments in cells in a varying (i.e. increasing) magnetic field with laser detection of the effective birefringence. For mixtures ZLI-2293 (and ZLI-4792) from Merck KGaA, elastic constants $K_1$ of 13.2 pN (and 12.5 pN), $K_2$ of 6.5 pN (and 7.3 pN) and $K_3$ of 18.3 pN (and 17.9 pN) are determined.

Alternatively, and in order to supplement and check the results, the following "pi cell" method developed by Brimicombe is suitable for determination of the elastic constants of the "twist" deformation, $K_{22}$ (Brimicombe, J. *Appl. Phys.*, 2007.101).

In this method, the liquid-crystalline medium to be investigated is introduced into a test cell made from glass with parallel-rubbed polyimide layers, a so-called "pi cell" (also written as "II cell"). The substrates are additionally each coated on their inside with a continuous layer of indium tin oxide (ITO), which serves as transparent electrode. In order to observe the changes in the optical retardation of the measurement cell which accompany the director deformation, a polariser is stuck to each substrate in such a way that the polarisation direction is in each case aligned parallel to the rubbing direction of the polyimide. These measurement cells are manufactured by Merck KGaA, Darmstadt, Germany. The polyimide used is SE-3140 from Nissan Chemicals, Japan, which produces a high pretilt (i.e. surface tilt angle) of about 5° to 6°. The layer thicknesses of the cells used are in the range from 8 μm to 10 μm.

Application of an alternating voltage of suitable size converts the liquid crystal into the so-called "bend" state, in which the LC adopts a bent director profile as in an "OCB" cell. The alternating voltage used has a frequency of 60 Hz. Firstly, a voltage of 20 V is applied in order to switch the cell for the first time, and the voltage is then immediately reduced to about 3 V or less in order to keep the LC in the bend state. This state appears black in the polariser configuration used here. If the voltage applied is reduced, the director changes from the bend state into the 180° twisted "twist" state. This state is characterised by a twist of the director through 180° over the layer thickness of the cell. Since the twisted state is energetically degenerate regarding the left-handed twist and right-handed twist, a bifurcation occurs. This is evident from an optically detectable threshold from which the transmission of the measurement cell changes drastically. Since this is a pure twist deformation of the director, the threshold voltage reacts extremely sensitively to a change in the elastic constant $K_{22}$ and can thus be used as a particularly suitable measure of this quantity. The threshold voltage is detected by means of the DMS 301 electro-optical measuring bench from Autronic-Melchers, Karlsruhe, Germany. The measurement is evaluated using the DIMOS 1.6 simulation software from the same company. The measurement configuration present is approximated with the aid of a one-dimensional "Berreman matrix" formulation and the threshold voltage is matched to the measurement by varying the value of $K_{22}$ correspondingly. The relative accuracy of the method is about +/−8%. The comparability with the conventional method for the determination of $K_{22}$, in which $K_{22}$ is determined with the aid of an aligning magnetic field, is very good.

As an illustration of this, the corresponding values obtained by the two different methods for three commercially available liquid-crystal mixtures E7, ZLI-2293 and ZLI-4792 (all Merck KGaA, Darmstadt, Germany) are shown in the following table.

| | Method: | |
| --- | --- | --- |
| | Conventional method (magnet) | Alternative method (pi cell) |
| Mixture | $K_{22}$/pN | $K_{22}$/pN |
| E7 | 6.5 | 6.4 |
| ZLI-2293 | 7.3 | 6.9 |
| ZLI-4792 | 6.5 | 6.5 |

The optical anisotropy ($\Delta n$), also known as birefringence, is determined at a wavelength of 589.3 nm. The dielectric anisotropy ($\Delta\varepsilon$) is determined at a frequency of 1 kHz.

If only the plural is given in a list of alternative possibilities, this also means the singular.

In connection with specifications of the composition of the media, or components thereof, "comprise" means that the concentration of the respective material mentioned, i.e. of the component or compound, in the reference unit, i.e. the medium or component, is preferably 10% or more, particularly preferably 20% or more and very particularly preferably 30% or more, "consist predominantly of" means that the concentration of the said material in the reference unit is preferably 50% or more, particularly preferably 60% or more and very particularly preferably 70% or more, and "consist virtually completely of" means that the concentration of the said material in the reference unit is preferably 80% or more, particularly preferably 90% or more and very particularly preferably 95% or more.

The dielectric properties, electro-optical properties (for example the threshold voltages) and the response times were determined in test cells produced by Merck KGaA, Darmstadt, Germany. The test cells for the determination of $\Delta\epsilon$ had a layer thickness of 22 μm and a circular electrode made from indium tin oxide (ITO) having an area of 1.13 cm² and a protective ring. For homeotropic alignment for the determination of $\epsilon_\parallel$, cells having a homeotropically aligning polyimide alignment layer were used. Alternatively, lecithin (Merck KGaA) can be used as alignment agent. The cells for the determination of $\epsilon_\perp$ had alignment layers of the polyimide AL-1054 from Japan Synthetic Rubber, Japan. The capacitances were generally measured using a Solatron 1260 frequency analyser with a rectangular wave with an effective voltage of 0.3 $V_{rms}$. The electro-optical investigations were carried out with white light. The characteristic voltages were determined with perpendicular viewing.

For the present invention and in the following examples, the structures of the liquid-crystal compounds are indicated by means of abbreviations, also known as acronyms, with the transformation into chemical formulae taking place in accordance with Tables A to C below. All radicals $C_nH_{2n+1}$, $C_mH_{2m+1}$ and $C_lH_{2l+1}$ and $C_nH_{2n}$, $C_mH_{2m}$ and $C_lH_{2l}$ are preferably straight-chain alkyl radicals or alkylene radicals, each having n, m or l C atoms, and —CH=CH— is preferably trans- or E-vinylene. Table A shows the codes for the ring elements of the nuclei of the compound. Table B lists the bridging members, and Table C lists the meanings of the symbols for the left-hand or right-hand end groups of the molecules. Table D shows illustrative molecular structures and abbreviations thereof.

TABLE A

Ring elements

TABLE A-continued
| Ring elements | | | |
|---|---|---|---|
| N | 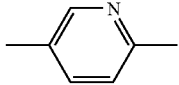 | NI | 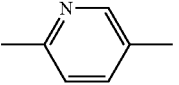 |
| Np | 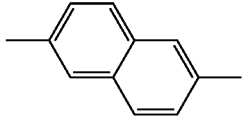 | | |
| N3f | 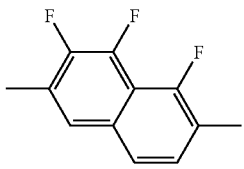 | N3fI | 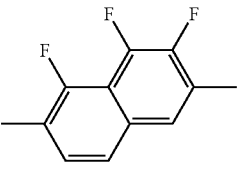 |
| tH | 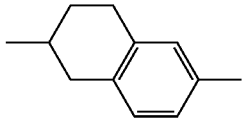 | tHI | 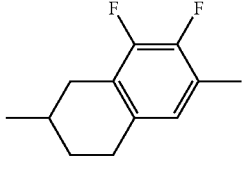 |
| tH2f | 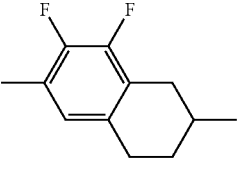 | tH2fI | 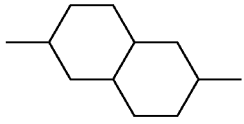 |
| dH | 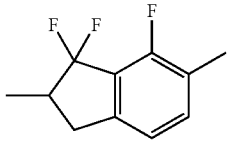 | | |
| K | 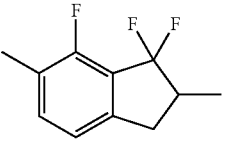 | KI | 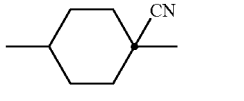 |
| nC | 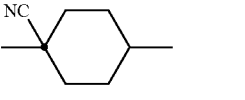 | nCI | 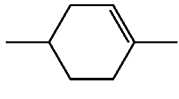 |
| L | 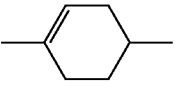 | LI | 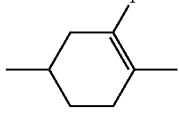 |
| F | 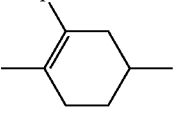 | FI | |

TABLE B

| | Bridging members | |
|---|---|---|
| E | $-CH_2-CH_2-$ | |
| V | $-CH=CH-$ | |
| T | $-C\equiv C-$ | |
| W | $-CF_2-CF_2-$ | |
| B | $-CF=CF-$ | |

TABLE B-continued

| | Bridging members | | |
|---|---|---|---|
| Z | $-CO-O-$ | ZI | $-O-CO-$ |
| X | $-CF=CH-$ | XI | $-CH=CF-$ |
| O | $-CH_2-O-$ | OI | $-O-CH_2-$ |
| Q | $-CF_2-O-$ | QI | $-O-CF_2-$ |

TABLE C

| End groups | | | |
|---|---|---|---|
| On the left individually or in combination | | On the right individually or in combination | |
| -n- | $C_nH_{2n+1}-$ | -n | $-C_nH_{2n+1}$ |
| -nO- | $C_nH_{2n+1}-O-$ | -nO | $-O-C_nH_{2n+1}$ |
| -V- | $CH_2=CH-$ | -V | $-CH=CH_2$ |
| -nV- | $C_nH_{2n+1}-CH=CH-$ | -nV | $-C_nH_{2n}-CH=CH_2$ |
| -Vn- | $CH_2=CH-C_nH_{2n}-$ | -Vn | $-CH=CH-C_nH_{2n+1}$ |
| -nVm- | $C_nH_{2n+1}-CH=CH-C_mH_{2m}-$ | -nVm | $-C_nH_{2n}-CH=CH-C_mH_{2m+1}$ |
| -N- | $N\equiv C-$ | -N | $-C\equiv N$ |
| -S- | $S=C=N-$ | -S | $-N=C=S$ |
| -F- | $F-$ | -F | $-F$ |
| -CL- | $Cl-$ | -CL | $-Cl$ |
| -M- | $CFH_2-$ | -M | $-CFH_2$ |
| -D- | $CF_2H-$ | -D | $-CF_2H$ |
| -T- | $CF_3-$ | -T | $-CF_3$ |
| -MO- | $CFH_2O-$ | -OM | $-OCFH_2$ |
| -DO- | $CF_2HO-$ | -OD | $-OCF_2H$ |
| -TO- | $CF_3O-$ | -OT | $-OCF_3$ |
| -A- | $H-C\equiv C-$ | -A | $-C\equiv C-H$ |
| -nA- | $C_nH_{2n+1}-C\equiv C-$ | -An | $-C\equiv C-C_nH_{2n+1}$ |
| -NA- | $N\equiv C-C\equiv C-$ | -AN | $-C\equiv C-C\equiv N$ |

| On the left only in combination | | On the right only in combination | |
|---|---|---|---|
| -...n...- | $-C_nH_{2n}-$ | -...n... | $-C_nH_{2n}-$ |
| -...M...- | $-CFH-$ | -...M... | $-CFH-$ |
| -...D...- | $-CF_2-$ | -...D... | $-CF_2-$ |
| -...V...- | $-CH=CH-$ | -...V... | $-CH=CH-$ |
| -...Z...- | $-CO-O-$ | -...Z... | $-CO-O-$ |
| -...ZI...- | $-O-CO-$ | -...ZI... | $-O-CO-$ |
| -...K...- | $-CO-$ | -...K... | $-CO-$ |
| -...W...- | $-CF=CF-$ | -...W... | $-CF=CF-$ | in which n and m are each integers, and the three dots "..." are place markers for other abbreviations from this table.

Besides the compounds of the formula I, the mixtures according to the invention preferably comprise one or more compounds of the compounds mentioned below.

TABLE D

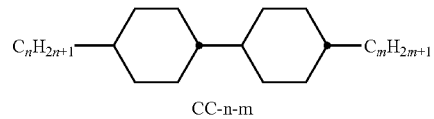

CC-n-m

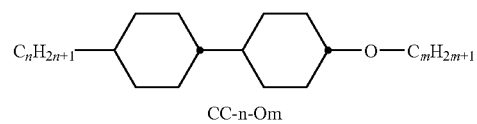

CC-n-Om

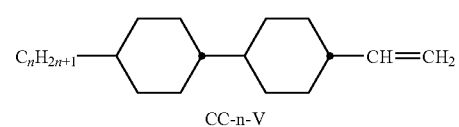

CC-n-V

TABLE D-continued
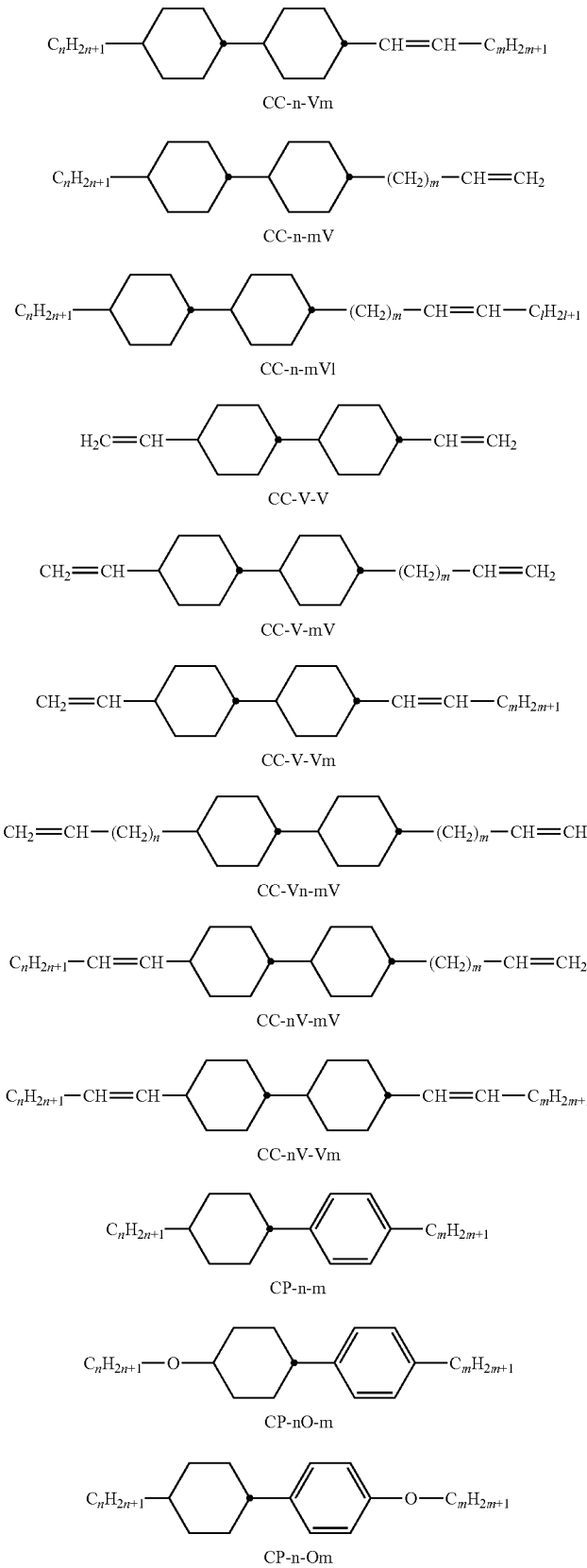

TABLE D-continued
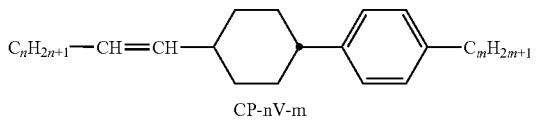
CP-nV-m
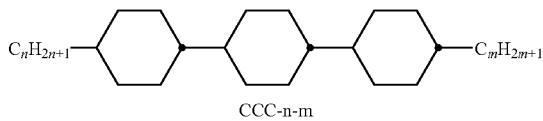
CCC-n-m
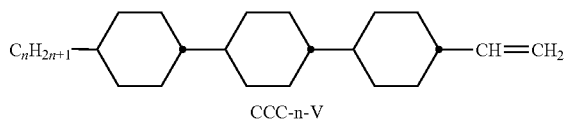
CCC-n-V
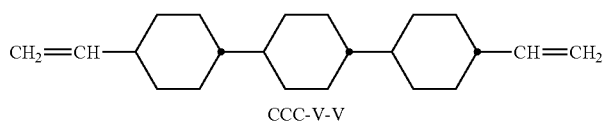
CCC-V-V
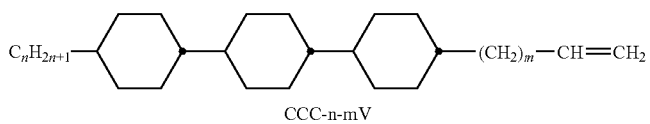
CCC-n-mV
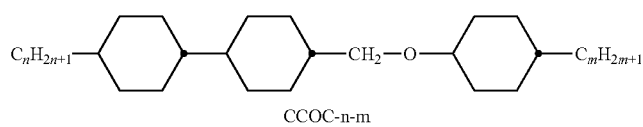
CCOC-n-m
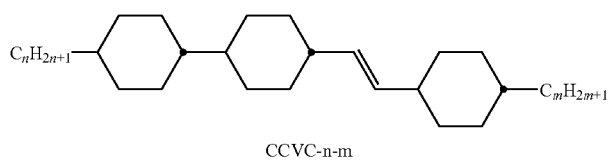
CCVC-n-m
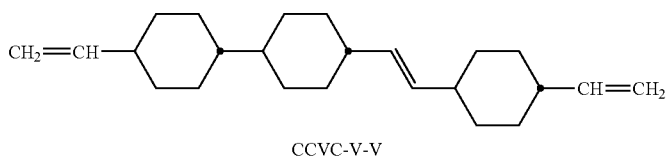
CCVC-V-V
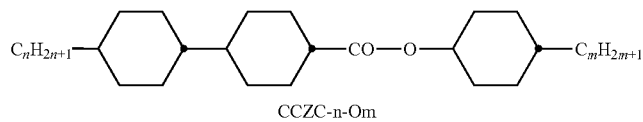
CCZC-n-Om
CCP-n-m
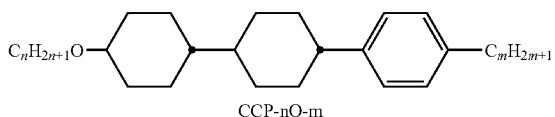
CCP-nO-m TABLE D-continued
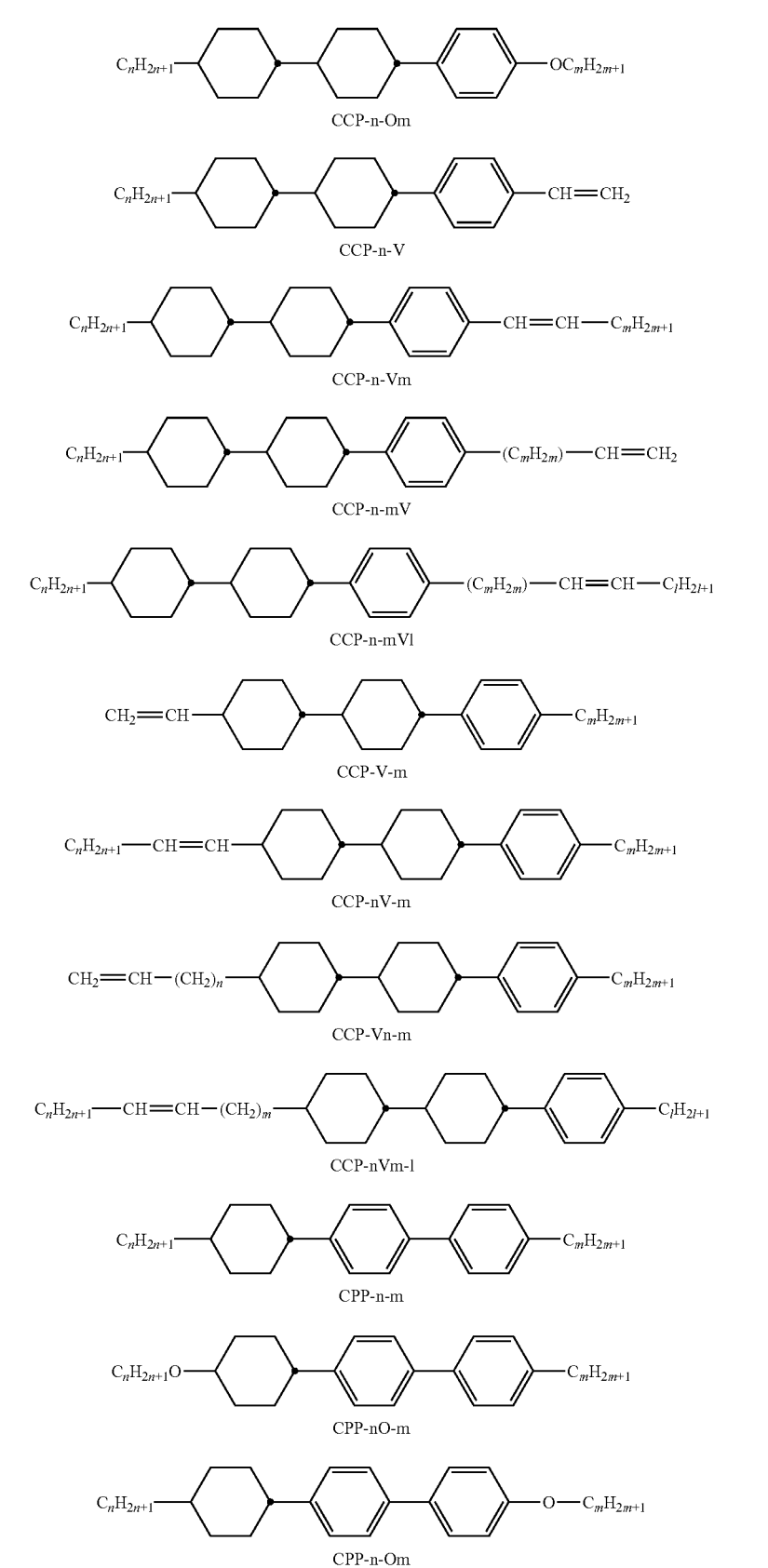

TABLE D-continued
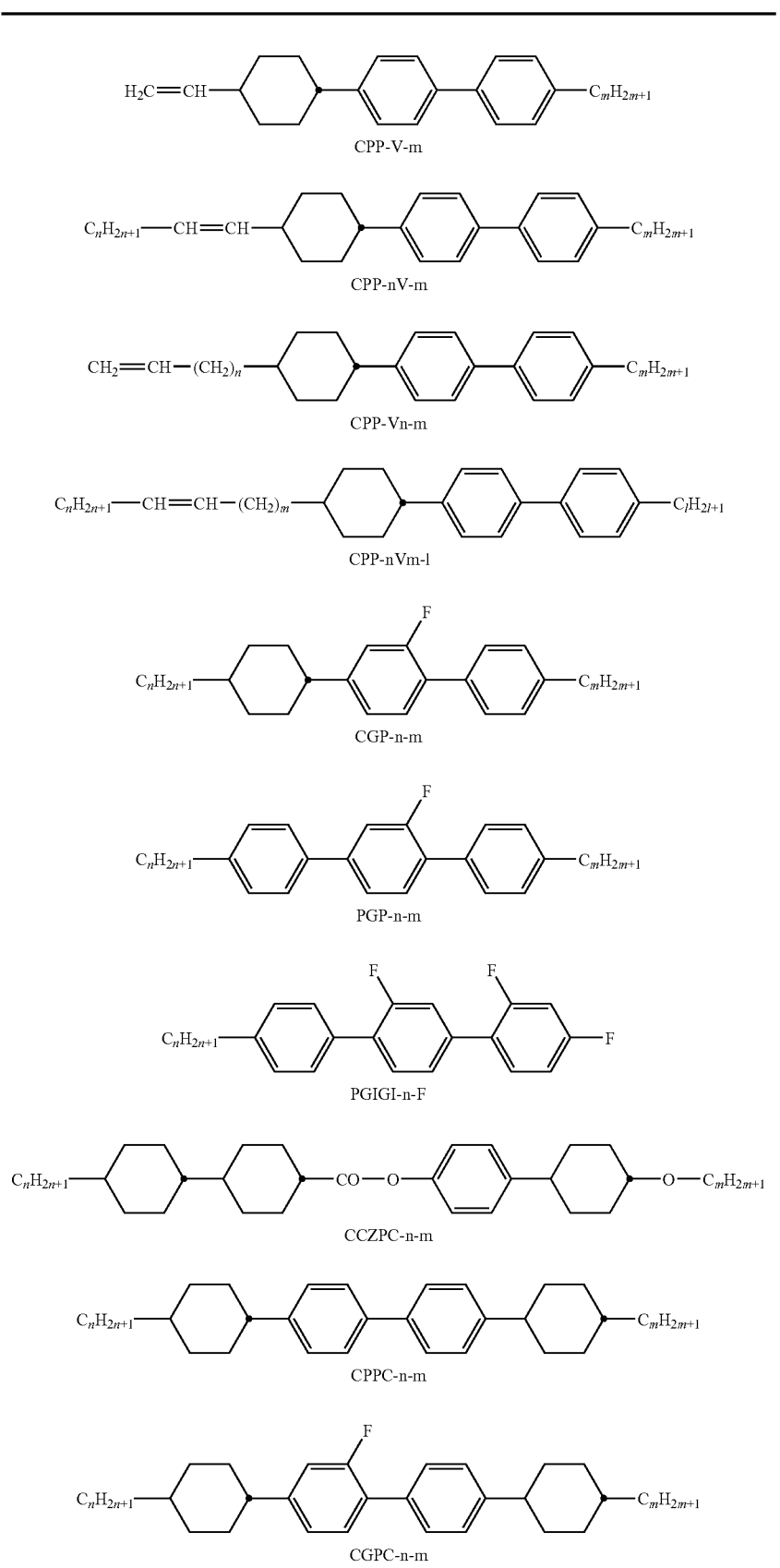

TABLE D-continued
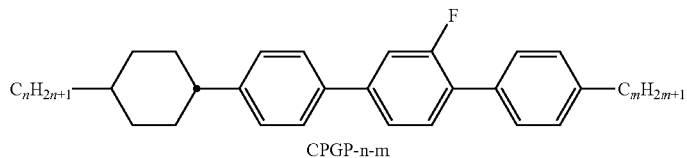
CPGP-n-m
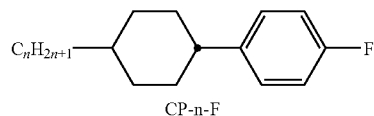
CP-n-F
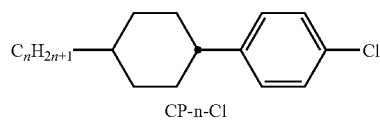
CP-n-Cl
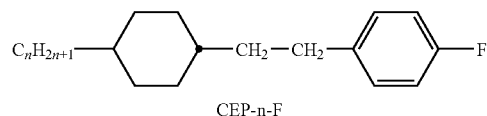
CEP-n-F
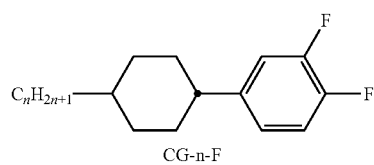
CG-n-F
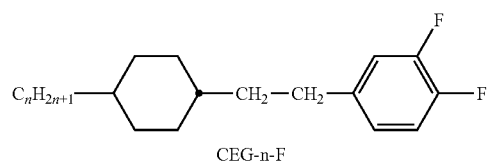
CEG-n-F
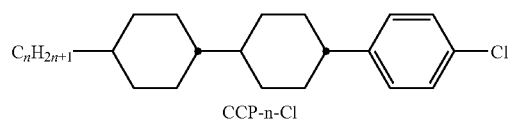
CCP-n-Cl
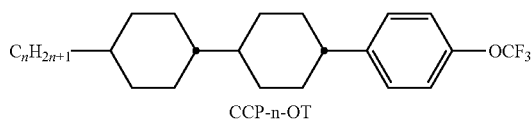
CCP-n-OT
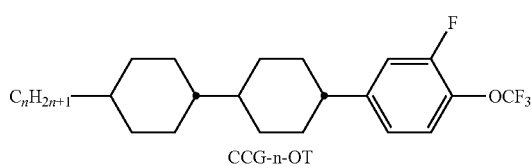
CCG-n-OT
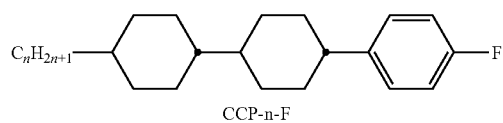
CCP-n-F TABLE D-continued
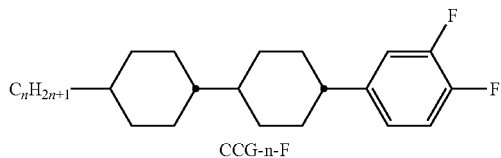
CCG-n-F
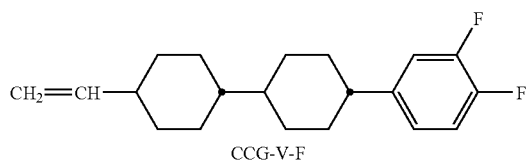
CCG-V-F
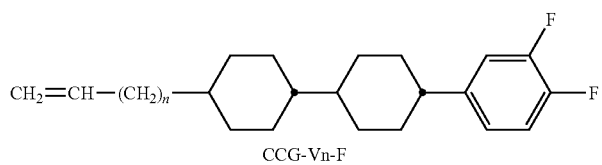
CCG-Vn-F
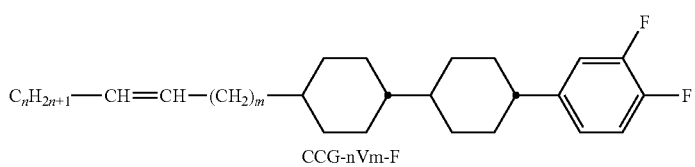
CCG-nVm-F
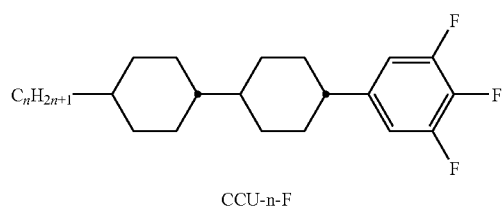
CCU-n-F
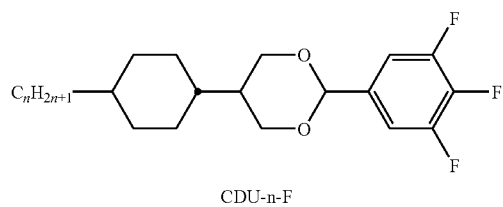
CDU-n-F
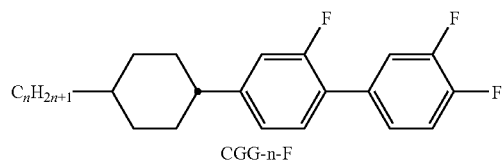
CGG-n-F
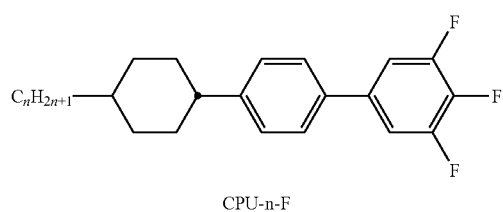
CPU-n-F TABLE D-continued
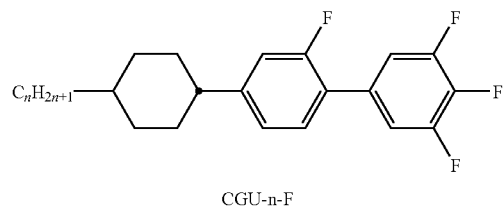
CGU-n-F
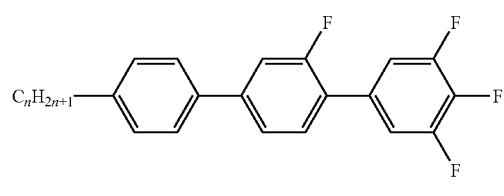
PGU-n-F
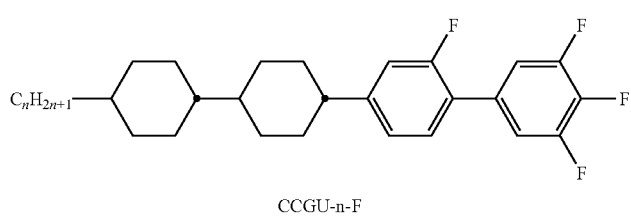
CCGU-n-F
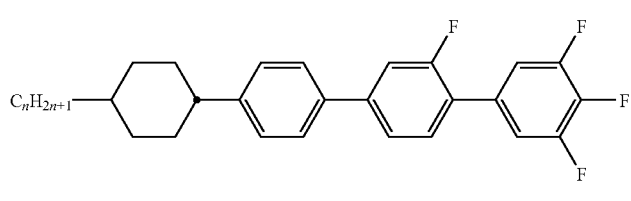
CPGU-n-F
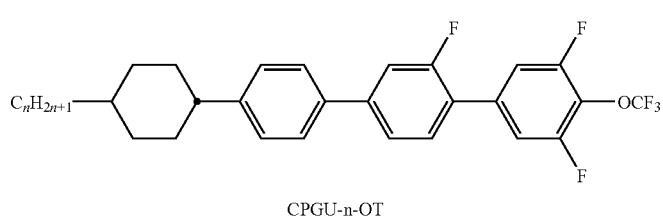
CPGU-n-OT
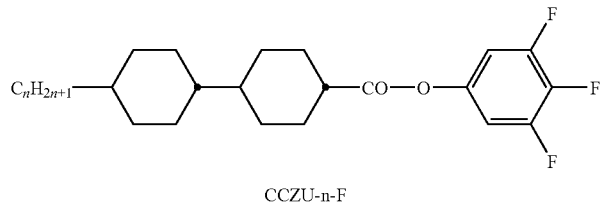
CCZU-n-F
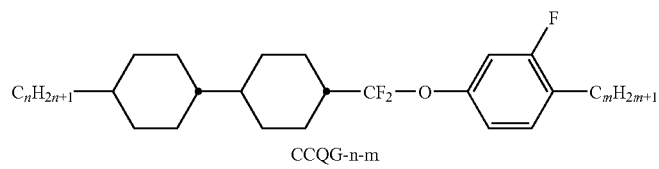
CCQG-n-m TABLE D-continued
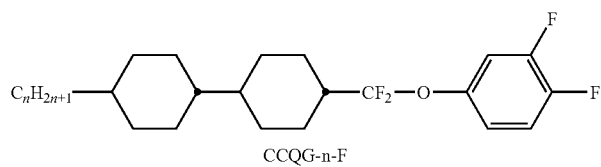
CCQG-n-F
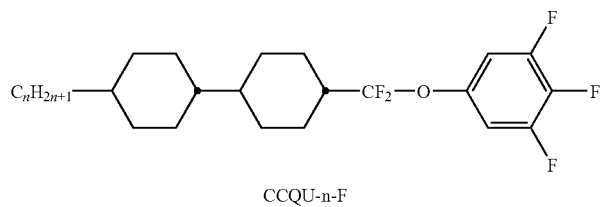
CCQU-n-F
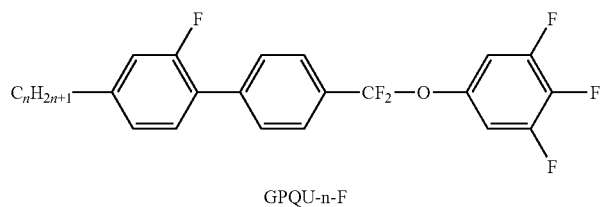
GPQU-n-F
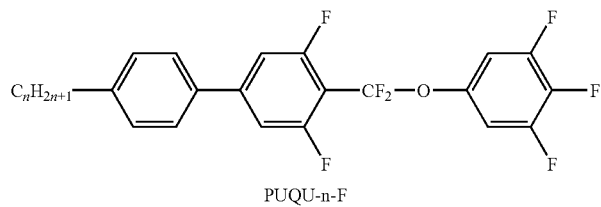
PUQU-n-F
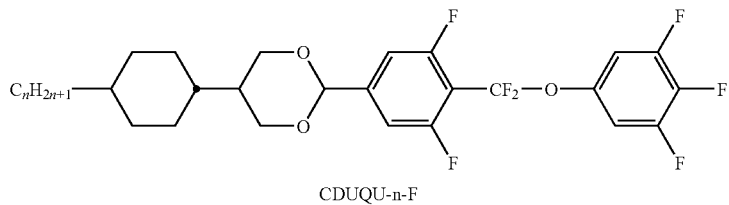
CDUQU-n-F
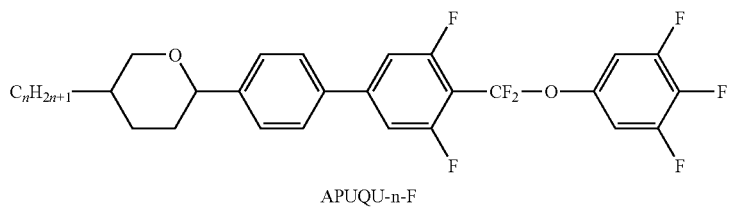
APUQU-n-F
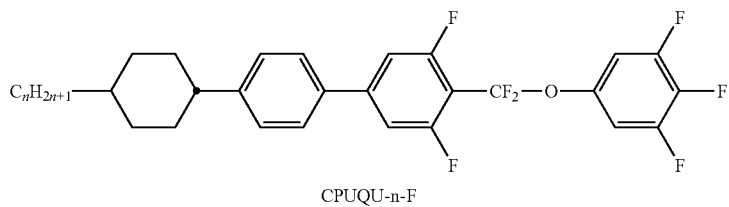
CPUQU-n-F TABLE D-continued
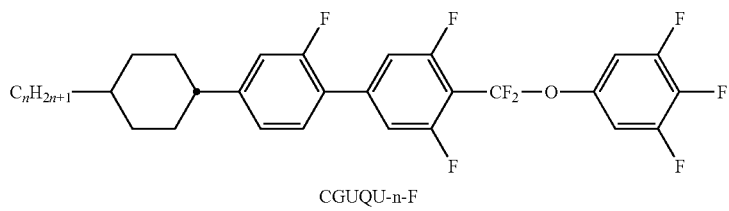
CGUQU-n-F
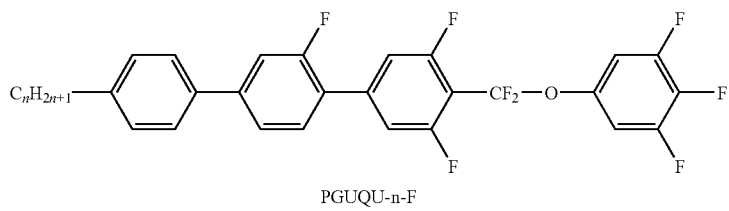
PGUQU-n-F
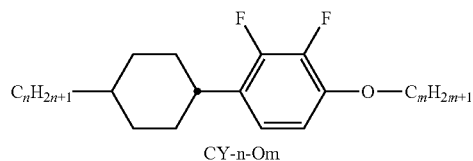
CY-n-Om
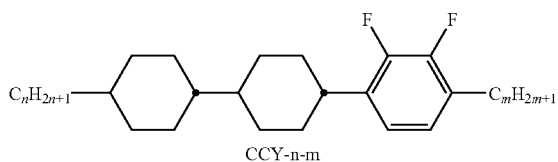
CCY-n-m
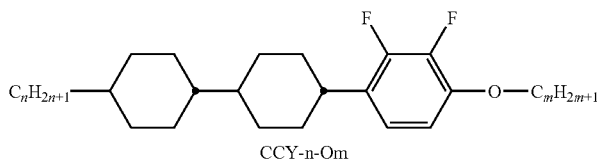
CCY-n-Om
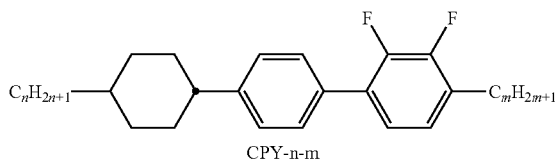
CPY-n-m
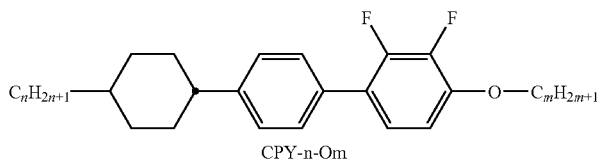
CPY-n-Om
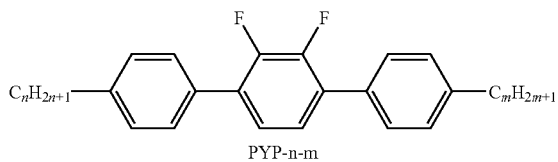
PYP-n-m TABLE D-continued
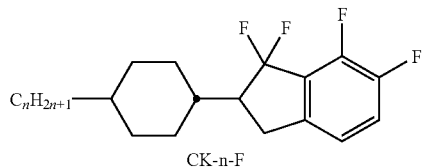
CK-n-F
Table E indicates chiral dopants which are preferably employed in the mixtures according to the invention.
TABLE E
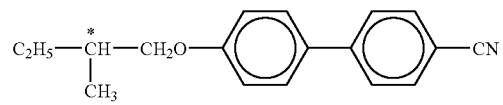
C 15
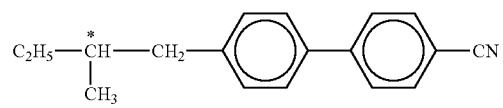
CB 15
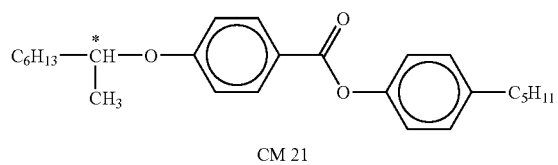
CM 21
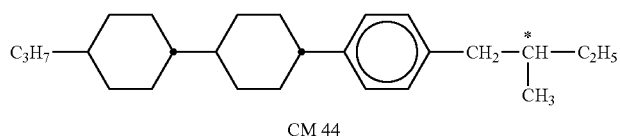
CM 44
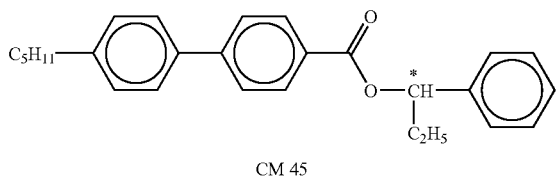
CM 45
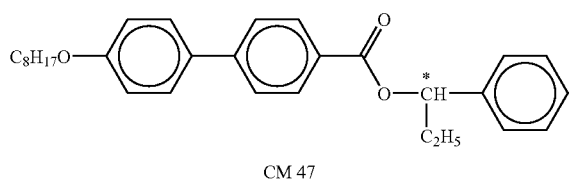
CM 47
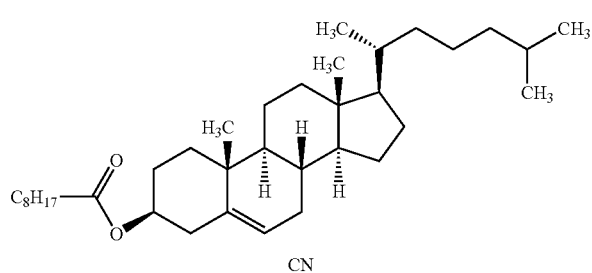
CN TABLE E-continued
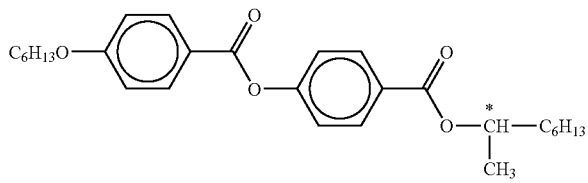
R S-811/S-811
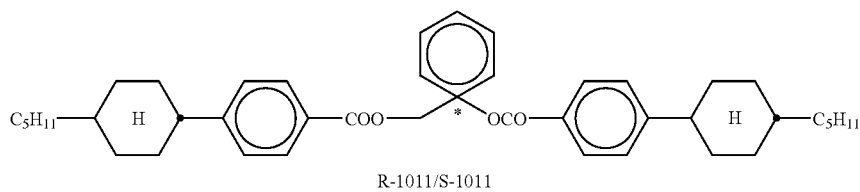
R-1011/S-1011
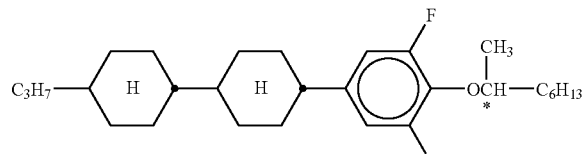
R-2011/S-2011
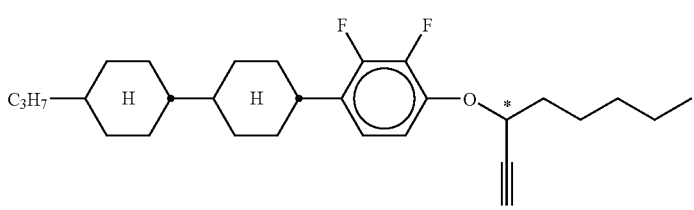
R-3011/S-3011
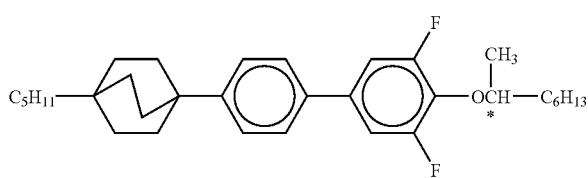
R-4011/S-4011
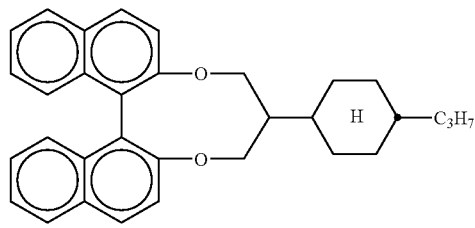
R-5011/S-5011
In a preferred embodiment of the present invention, the media according to the invention comprise one or more compounds selected from the group of the compounds from Table E.
Stabilisers which can be added, for example, to the mixtures according to the invention are shown in the table below, Table F.

TABLE F
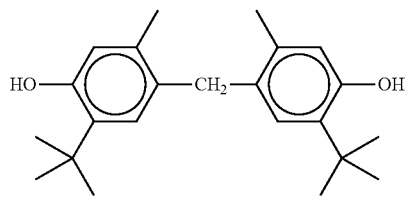
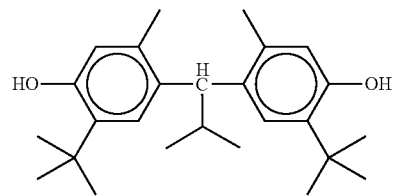
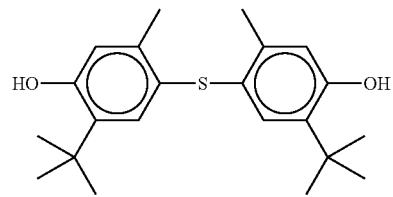
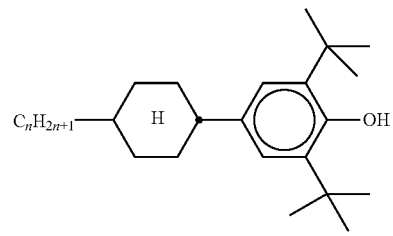
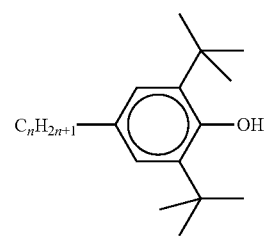
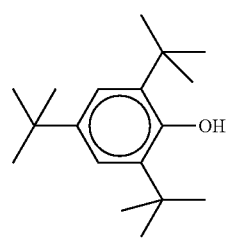
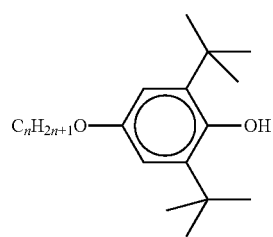

TABLE F-continued
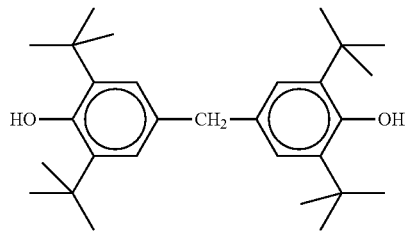
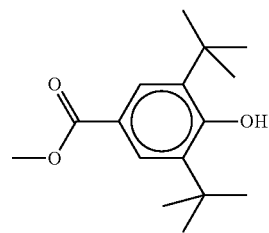
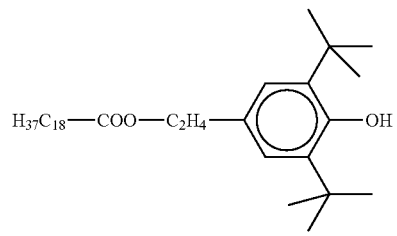
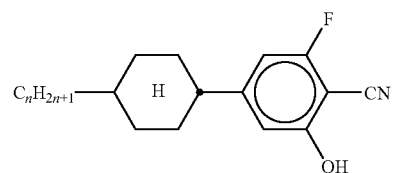
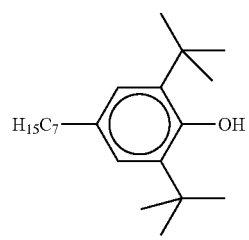
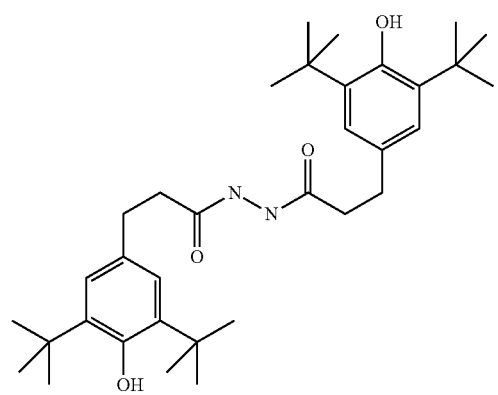

TABLE F-continued
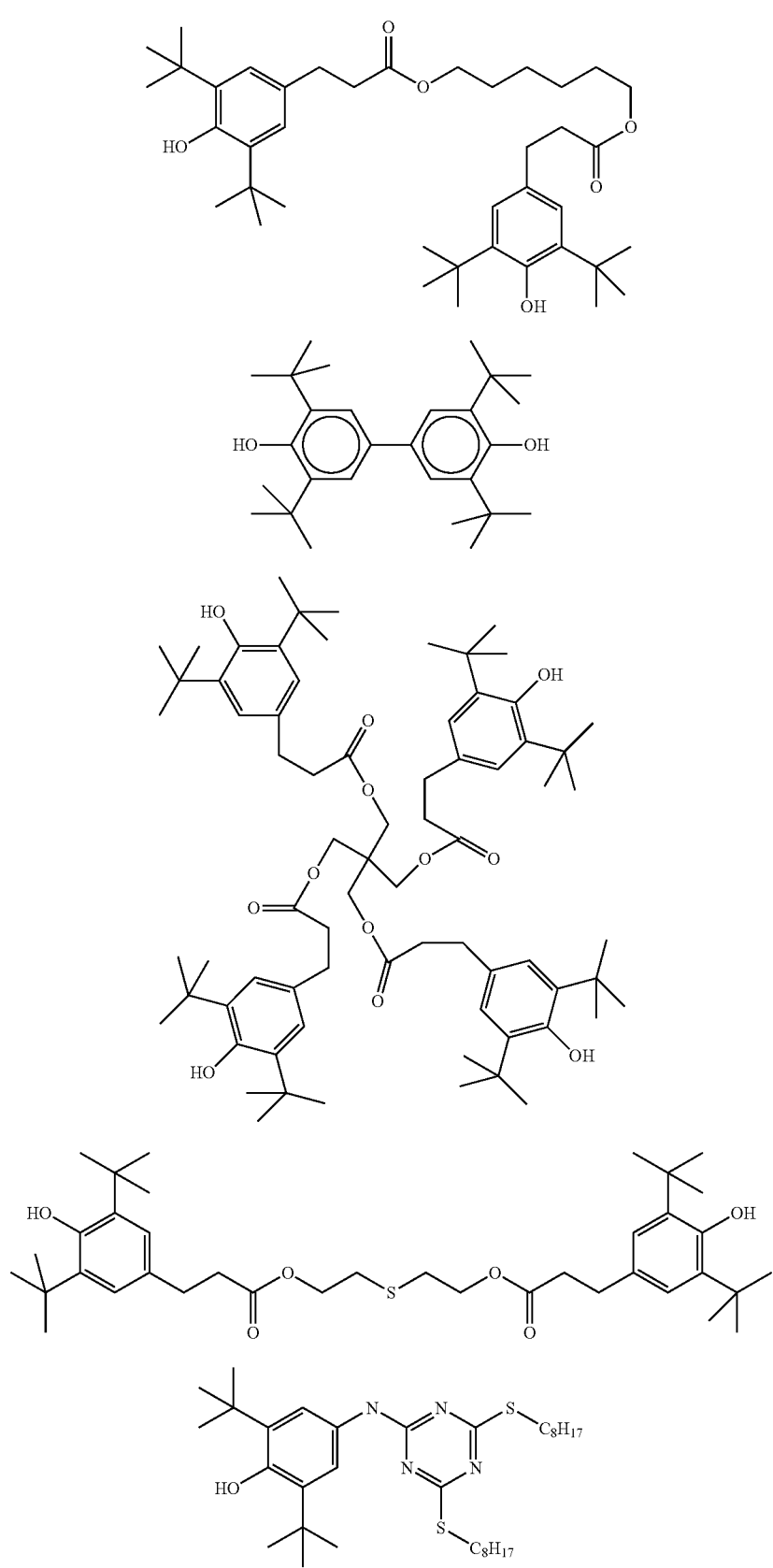

TABLE F-continued
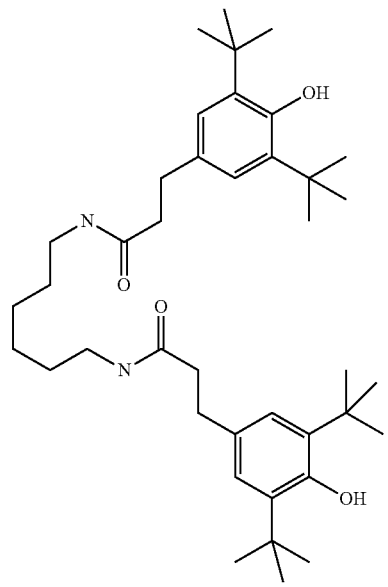
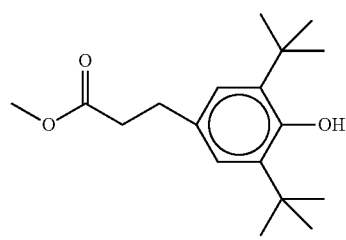
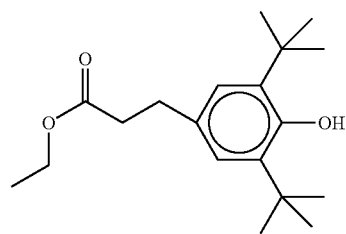
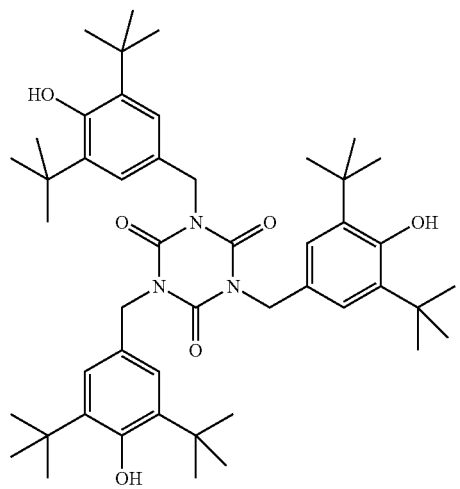

TABLE F-continued
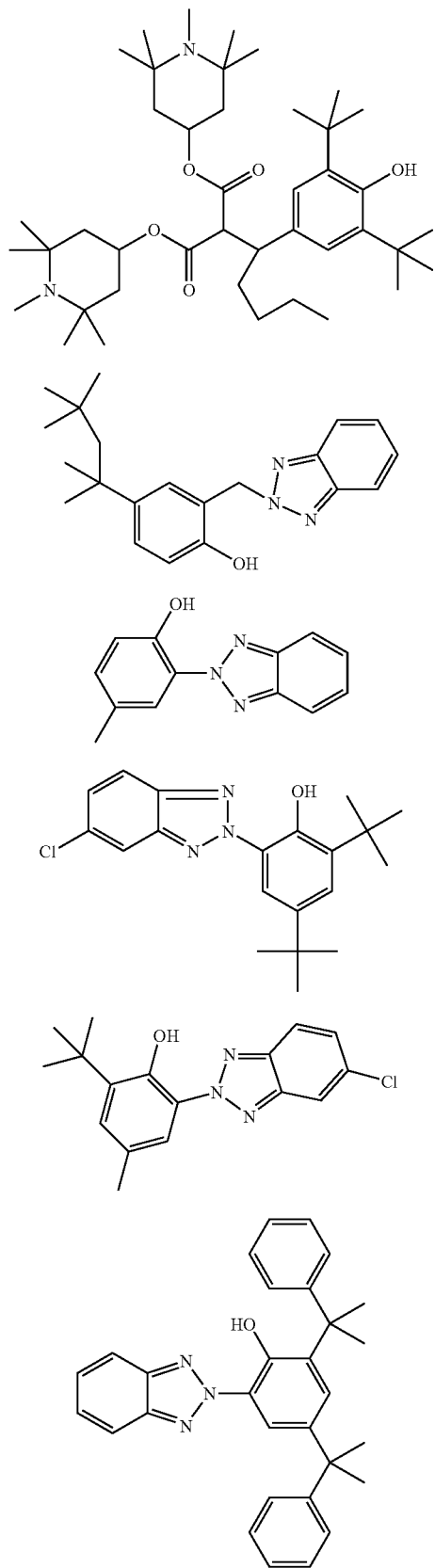

TABLE F-continued
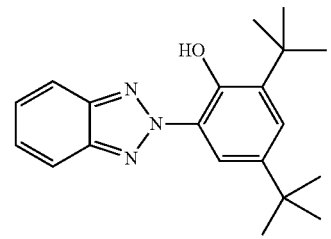
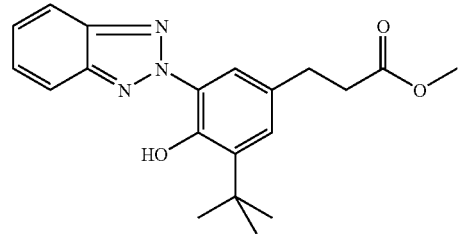
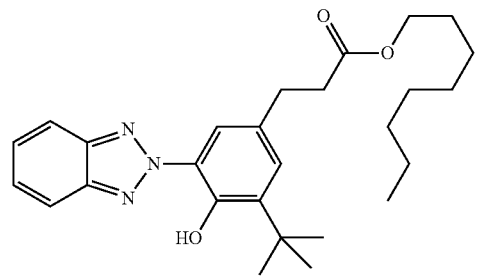
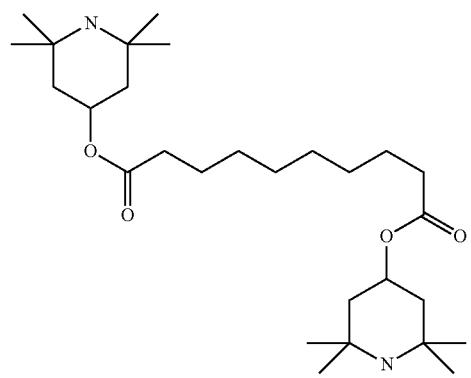
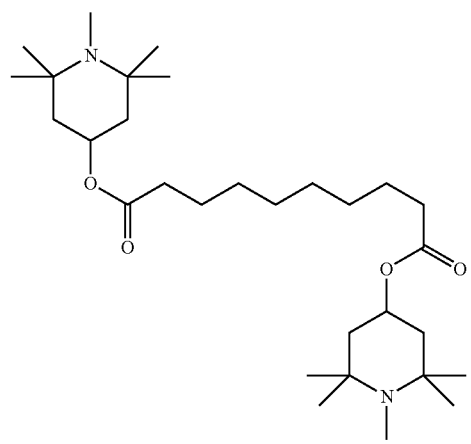

TABLE F-continued

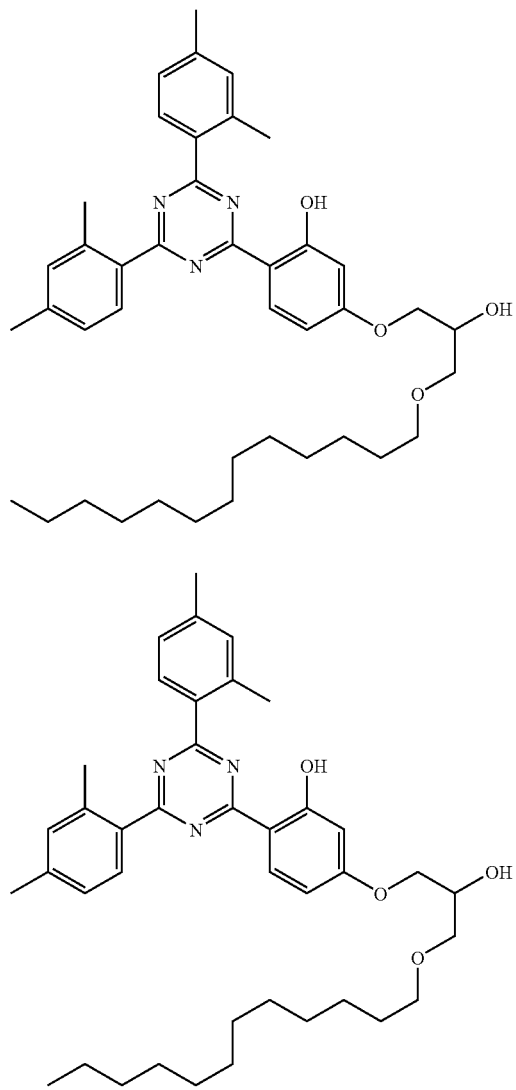

(n here denotes an integer from 1 to 12.)

In a preferred embodiment of the present invention, the media according to the invention comprise one or more compounds selected from the group of the compounds from Table F.

The liquid-crystalline media in accordance with the present application preferably comprise
- four or more, preferably six or more, compounds selected from the group of the compounds from Table D, preferably
- seven or more, preferably eight or more, compounds, preferably compounds having three or more, preferably four or more, different formulae selected from the group of the compounds from Table D.

The examples described below illustrate the present invention without restricting it in any way. Furthermore, they show the person skilled in the art what properties and in particular what property combinations can be achieved with the present invention.

EXAMPLES

Comparative Example

A liquid-crystal mixture of the following composition is prepared and investigated.

| Composition | | |
|---|---|---|
| Compound | | Concentration |
| No. | Abbreviation | /% by weight |
| 1 | PGU-2-F | 7.5 |
| 2 | PUQU-2-F | 11.0 |
| 3 | PUQU-3-F | 11.0 |
| 4 | CC-3-V | 25.0 |

-continued

| | | |
|---|---|---|
| 5 | CC-3-V1 | 14.0 |
| 6 | CCP-V-1 | 9.0 |
| 7 | CCP-V2-1 | 9.5 |
| 8 | CPP-3-2 | 9.0 |
| 9 | PGP-2-3 | 4.0 |
| Σ | | 100.0 |

Physical properties

| | |
|---|---|
| T(N, I) = | 74.0° C. |
| $n_e$(20° C., 589 nm) = | 1.6024 |
| Δn(20° C., 589 nm) = | 0.1115 |
| $\epsilon_{\parallel}$(20° C., 1 kHz) = | 10.0 |
| Δε(20° C., 1 kHz) = | +6.8 |
| $K_1$(20° C.) = | 13.0 pN |
| $K_2$(20° C.) = | 5.7 pN |
| $K_3$(20° C.) = | 12.5 pN |
| $K_1/K_2$(20° C.) = | 2.28 |
| $K_1/K_3$(20° C.) = | 1.04 |
| $K_3/K_2$(20° C.) = | 2.19 |
| $\gamma_1$(20° C.) = | 57 mPa·s |
| TN: | |
| $V_0$(20° C.) = | 1.45 V |

An electro-optical test cell with a light-switching element containing the liquid-crystal mixture is produced. The substrates consist of glass. Substrates with alignment layer are used. The electrode structure consists of a pixel electrode with a plurality of mutually parallel slots and an unstructured counterelectrode. The width of the individual electrode strips of the comb-shaped electrode is 4.0 µm in each case and the separation of the individual electrode strips from one another is 6.0 µm in each case. The layer thickness of the electrodes is 55 nm. These electrode strips are all located in a common plane. The counterelectrode is unstructured and extends over the entire area of the light-modulation element (i.e. 1 cm²). The pixel electrode is separated from the counterelectrode by a layer of $SiN_x$ with a thickness of 610 nm. The layer thickness of the modulation medium is 3.6 µm.

A first polariser is used in front of the cell and a second polariser (analyser) is used behind the cell. The absorption axes of the two polarisers form an angle of 90° to one another. The angle between the axis of maximum absorption of the polarisers and the component of the electric field in the plane of the display on the side of the first polariser is (in each case) 45°. The voltage/transmission characteristic line is determined using a DMS 703 electro-optical measuring bench from Autronic-Melchers, Karlsruhe, Germany. The operating temperature is 20° C.

The value of the threshold voltage ($V_{10}$) is 1.94 V, the value of the mid-grey voltage ($V_{50}$) is 2.73 V, $V_{70}$ is 3.15 V, and the value of the saturation voltage ($V_{90}$) is 3.82 V. The maximum transmission is achieved at a voltage $V_{max}$, of 5.0 V.

Example 1

A liquid-crystal mixture of the following composition is prepared and investigated.

| Composition | | |
|---|---|---|
| Compound | | Concentration |
| No. | Abbreviation | /% by weight |
| 1 | CCP-3-OT | 3.0 |
| 2 | CCG-V-F | 5.0 |

-continued

| | | |
|---|---|---|
| 3 | CCQU-5-F | 8.0 |
| 4 | PGU-3-F | 8.5 |
| 5 | PUQU-2-F | 7.5 |
| 6 | PUQU-3-F | 7.0 |
| 7 | CCGU-3-F | 2.5 |
| 8 | CC-3-V1 | 16.0 |
| 9 | CC-5-V | 16.0 |
| 10 | PP-1-2V1 | 8.5 |
| 11 | CCP-V-1 | 14.0 |
| 12 | CCP-V2-1 | 4.0 |
| Σ | | 100.0 |

Physical properties

| | |
|---|---|
| T(N, I) = | 79.0° C. |
| $n_e$(20° C., 589 nm) = | 1.5970 |
| Δn(20° C., 589 nm) = | 0.1095 |
| $\epsilon_{\parallel}$(20° C., 1 kHz) = | 10.1 |
| Δε(20° C., 1 kHz) = | +7.0 |
| $K_1$20° C.) = | 14.7 pN |
| $K_2$(20° C.) = | 5.9 pN |
| $K_3$(20° C.) = | 14.5 pN |
| $K_1/K_2$(20° C.) = | 2.46 |
| $K_1/K_3$(20° C.) = | 1.00 |
| $K_3/K_2$(20° C.) = | 2.46 |
| $\gamma_1$(20° C.) = | 72 mPa·s |
| TN: | |
| $V_0$(20° C.) = | 1.52 V |

An electro-optical test cell with a light-switching element containing the liquid-crystal mixture is produced as described in Comparative Example 1. The layer thickness of the modulation medium is 3.6 µm and the optical retardation is thus 0.39 µm.

The test cell is investigated as described in the Comparative Example.

The value of the threshold voltage ($V_{10}$) is 1.99 V, the value of the mid-grey voltage ($V_{50}$) is 2.79 V, $V_{70}$ is 3.20 V, and the value of the saturation voltage ($V_{90}$) is 3.87 V. The maximum transmission is achieved at a voltage $V_{max}$ of 5.0 V.

This light-modulation element of this example has a greater maximum transmission than the light-modulation element/the test cell of the Comparative Example. If the maximum transmission of the light-modulation element of this example is taken as reference (i.e. 100%), the maximum transmission of the light-modulation element of the Comparative Example is only 91%.

The minimum transmissions of the two light-modulation elements of Example 1 and of the Comparative Example have virtually the same value of about 2.7%. The light-modulation element of Example 1 thus also has higher contrast than the light-modulation element of the Comparative Example.

Example 2

A liquid-crystal mixture of the following composition is prepared and investigated as described under Example 1.

| Composition | | |
|---|---|---|
| Compound | | Concentration/ |
| No. | Abbreviation | % by weight |
| 1 | CCP-2-OT | 5.0 |
| 2 | CCP-3-OT | 5.0 |
| 3 | CCP-5-OT | 1.5 |

-continued

| | | |
|---|---|---|
| 4 | PGU-3-F | 5.0 |
| 5 | PUQU-3-F | 13.0 |
| 6 | CC-3-V | 20.0 |
| 7 | CC-3-V1 | 11.5 |
| 8 | CC-5-V | 10.0 |
| 9 | PP-1-2V1 | 8.5 |
| 10 | CCP-V-1 | 11.0 |
| 11 | CCP-V2-1 | 6.0 |
| 12 | CPP-3-2 | 4.0 |
| Σ | | 100.0 |

| Physical properties | |
|---|---|
| T(N, I) = | 75.0° C. |
| $n_e$(20° C., 589 nm) = | 1.5875 |
| Δn(20° C., 589 nm) = | 0.1011 |
| $\epsilon_{\parallel}$(20° C., 1 kHz) = | 14.5 |
| Δε(20° C., 1 kHz) = | +7.1 |
| $K_1$ 20° C.) = | 14.5 pN |
| $K_2$(20° C.) = | 6.1 pN |
| $K_3$(20° C.) = | 14.8 pN |
| $K_1/K_2$(20° C.) = | 2.37 |
| $K_1/K_3$(20° C.) = | 0.98 |
| $K_3/K_2$(20° C.) = | 2.43 |
| $\gamma_1$(20° C.) = | 50 mPa·s |
| TN: | |
| $V_0$(20° C.) = | 1.88 V |

The corresponding test cell is investigated as described in the Comparative Example. Comparably good results are achieved.

Example 3

A liquid-crystal mixture of the following composition is prepared and investigated as described under Example 1.

| Composition | | |
|---|---|---|
| Compound | | Concentration/ |
| No. | Abbreviation | % by weight |
| 1 | CCP-3-OT | 8.0 |
| 2 | CCP-4-OT | 8.0 |
| 3 | CCP-5-OT | 10.0 |
| 4 | PGU-2-F | 4.0 |
| 5 | CCQU-3-F | 10.0 |
| 6 | PUQU-3-F | 20.0 |
| 7 | CC-3-V | 10.0 |
| 8 | CC-3-V1 | 11.0 |
| 9 | CCP-V-1 | 4.0 |
| 10 | PP-1-2V1 | 11.0 |
| 11 | CPP-3-2 | 4.0 |
| Σ | | 100.0 |

| Physical properties | |
|---|---|
| T(N, I) = | 77.0° C. |
| $n_e$(20° C., 589 nm) = | 1.5934 |
| Δn(20° C., 589 nm) = | 0.1011 |
| $\epsilon_{\parallel}$(20° C., 1 kHz) = | 12.3 |
| Δε(20° C., 1 kHz) = | +9.1 |
| $K_1$ 20° C.) = | 15.9 pN |
| $K_2$(20° C.) = | 7.5 pN |
| $K_3$(20° C.) = | 14.0 pN |
| $K_1/K_2$(20° C.) = | 2.12 |
| $K_1/K_3$(20° C.) = | 1.14 |
| $K_3/K_2$(20° C.) = | 12873 |
| $\gamma_1$(20° C.) = | 77 mPa·s |
| TN: | |
| $V_0$(20° C.) = | 1.39 V |

The corresponding test cell is investigated as described in the Comparative Example and comparably good results are achieved.

Example 4

A liquid-crystal mixture of the following composition is prepared and investigated as described under Example 1.

| Composition | | |
|---|---|---|
| Compound | | Concentration/ |
| No. | Abbreviation | % by weight |
| 1 | CCP-2-OT | 4.0 |
| 2 | CCP-3-OT | 8.0 |
| 3 | CCP-4-OT | 4.50 |
| 4 | CCP-5-OT | 9.0 |
| 5 | PGU-2-F | 5.0 |
| 6 | CCQU-3-F | 8.5 |
| 7 | PUQU-2-F | 5.0 |
| 8 | PUQU-3-F | 9.0 |
| 9 | CC-3-V | 15.0 |
| 10 | CC-3-V1 | 11.0 |
| 11 | PP-1-2V1 | 10.0 |
| 12 | CCP-V2-1 | 4.0 |
| 13 | CPP-3-2 | 3.5 |
| Σ | | 100.0 |

| Physical properties | |
|---|---|
| T(N, I) = | 76.0° C. |
| $n_e$(20° C., 589 nm) = | 1.5935 |
| Δn(20° C., 589 nm) = | 0.1109 |
| $\epsilon_{\parallel}$(20° C., 1 kHz) = | 11.3 |
| Δε(20° C., 1 kHz) = | +8.1 |
| $K_1$ 20° C.) = | 15.3 pN |
| $K_2$(20° C.) = | 6.6 pN |
| $K_3$(20° C.) = | 13.7 pN |
| $K_1/K_2$(20° C) = | 2.32 |
| $K_1/K_3$(20° C.) = | 1.12 |
| $K_3/K_2$(20° C.) = | 2.08 |
| $\gamma_1$(20° C.) = | 66 mPa·s |
| TN: | |
| $V_0$(20° C.) = | 1.45 V |

The corresponding test cell is investigated as described in the Comparative Example and comparably good results are achieved.

The invention claimed is:

1. An electro-optical light-modulation element comprising:
an electrode arrangement comprising
a structured electrode having two or more structures which are essentially parallel to one another and are insulated from one another over a significant proportion of their length, and
a counterelectrode which extends essentially over the entire active area of the light-modulation element, and
a nematic liquid-crystalline modulation medium;
wherein said liquid-crystalline modulation medium has an elastic constant $K_1$ of 14.0 pN or more than 14.0 pN and an elastic constant $K_2$ of 2.0 pN-20.0 pN.

2. A light-modulation element according to claim 1, further comprising an element for the polarization of light or a plurality of elements for the polarization of light.

3. A light-modulation element according to claim 1, wherein said electrode arrangement is able to generate an electric field having a significant component both parallel to the surface of the liquid-crystalline medium and also perpendicular thereto.

4. A light-modulation element according to claim 1, wherein said liquid-crystalline modulation medium has a quotient of the elastic constants $K_2/K_1$ of 0.5 or less than 0.5.

5. A light-modulation element according to claim 1, wherein on operation of said light-modulation element, said electrode arrangement generates an electric field both having a significant component parallel to the plane of said liquid-crystalline modulation medium and also having a significant component perpendicular to the plane of said liquid-crystalline modulation medium.

6. A light-modulation element according to claim 1, wherein on passage through said light-modulation element, light passes through in each case at least one element for the polarization of light before passing through said modulation medium and after passing through said mesogenic medium.

7. A light-modulation element according to claim 1, wherein said liquid-crystalline modulation medium is in the form of a layer and said electrode arrangement is located on one side of the layer of said liquid-crystalline modulation medium, and said electrode arrangement optionally contains an additional birefringent layer.

8. A method of generating a display of information comprising displaying information on a light-modulation element according to claim 1.

9. An electro-optical display containing a light-modulation element or a plurality of light-modulation elements according to claim 1.

10. An electro-optical display according to claim 9, wherein said display is addressed by means of an active matrix.

11. An electro-optical system containing an electro-optical display or a plurality of electro-optical displays according to claim 9.

12. An electro-optical display system according to claim 11, said system can be used as television screen and/or as computer monitor.

13. A method of generating a display of video signals and/or digital signals comprising displaying said video signals and/or digital signals on an electro-optical display system according to claim 11.

14. A nematic liquid-crystalline medium comprising at least one compound of formula I

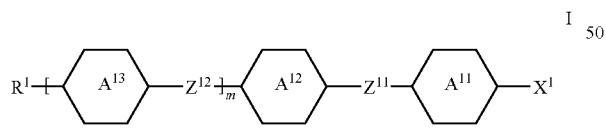

in which
  $R^1$ denotes alkyl or alkoxy, each having 1 to 7 C atoms, alkenyl, alkenyloxy, alkynyl or alkoxyalkyl, each having 2 to 7 C atoms,
  one or more of the rings

to

present denotes

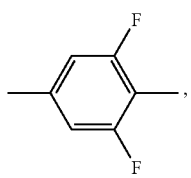

and the other rings

to

if present each, independently of one another, and, if

is present more than once, also these independently of one another, denote

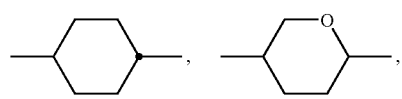

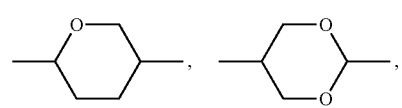

-continued

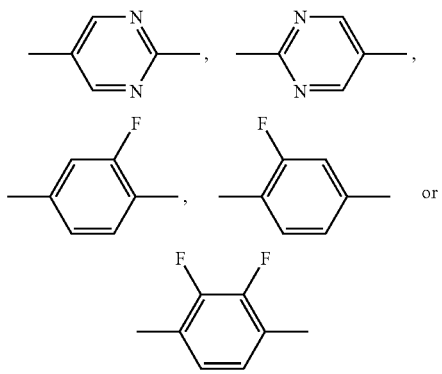

$Z^{11}$ and $Z^{12}$ if present each, independently of one another and, if $Z'^2$ is present more than once, also these independently of one another, denote a single bond, —CO—O—, trans —CH=CH—, —CH=CF—, —CF=CH—, —CF=CF—, —CH=CH—CO—O—, —CF=CF—CO—O—, —CF=CH—CO—O—, —CH=CF—CO—O—, —CF$_2$—O—, —O—CF$_2$— or —C≡C—, $X^1$ denotes F, Cl, —OCF$_3$, —CF$_3$, —OCF$_2$H, CN, —C≡C—CN or NCS, and m denotes 0, 1 or 2, wherein said nematic liquid-crystalline medium has an elastic constant $K_1$ of 14.0 pN or more than 14.0 pN and an elastic constant $K_2$ of 2.0 pN-20.0 pN.

15. A light-modulation element according to claim 1, wherein said liquid crystalline modulation medium comprises at least one compound of formula I

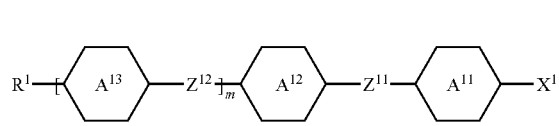

in which

R$^1$ denotes alkyl or alkoxy, each having 1 to 7 C atoms, alkenyl, alkenyloxy, alkynyl or alkoxyalkyl, each having 2 to 7 C atoms, one or more of the rings

to

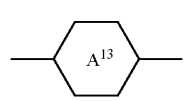

present denotes

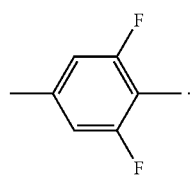

and the other rings

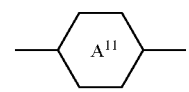

to

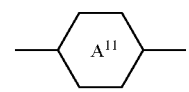

if present each, independently of one another, and, if

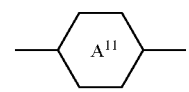

is present more than once, also these independently of one another, denote

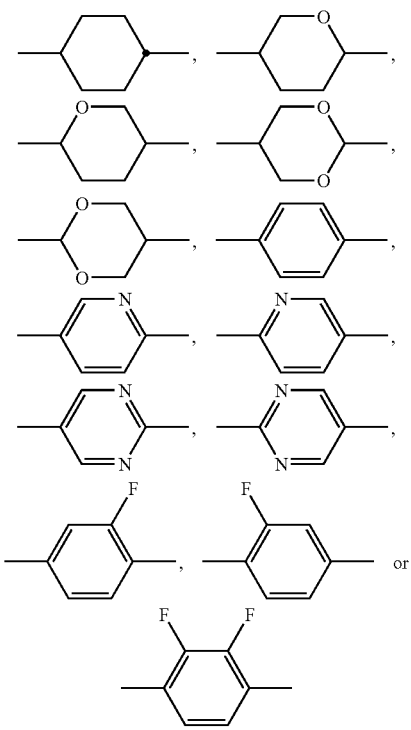

$Z^{11}$ and $Z^{12}$ if present each, independently of one another and, if $Z^{12}$ is present more than once, also these independently of one another, denote a single bond, —CO—O—, trans —CH═CH—, —CH═CF—, —CF═CH—, —CF═CF—, —CH═CH—CO—O—, —CF═CF—CO—O—, —CF═CH—CO—O—, —CH═CF—CO—O—, —CF$_2$—O—, —O—CF$_2$— or —C≡C—, $X^1$ denotes F, Cl, —OCF$_3$, —CF$_3$, —OCF$_2$H, CN, —C≡C—CN or NCS, and m denotes 0, 1 or 2.

16. A method according to claim 8, wherein said liquid-crystalline modulation medium comprises at least one compound of formula I

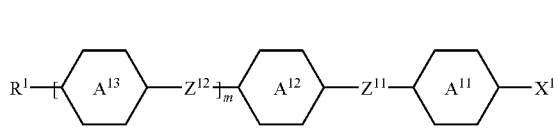

I in which

R$^1$ denotes alkyl or alkoxy, each having 1 to 7 C atoms, alkenyl, alkenyloxy, alkynyl or alkoxyalkyl, each having 2 to 7 C atoms, one or more of the rings

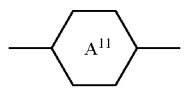

to

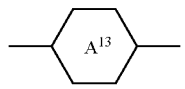

present denotes

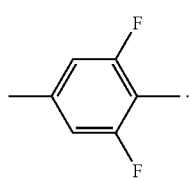

and the other rings

to

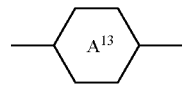

if present each, independently of one another, and, if

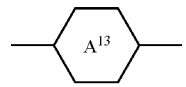

is present more than once, also these independently of one another, denote

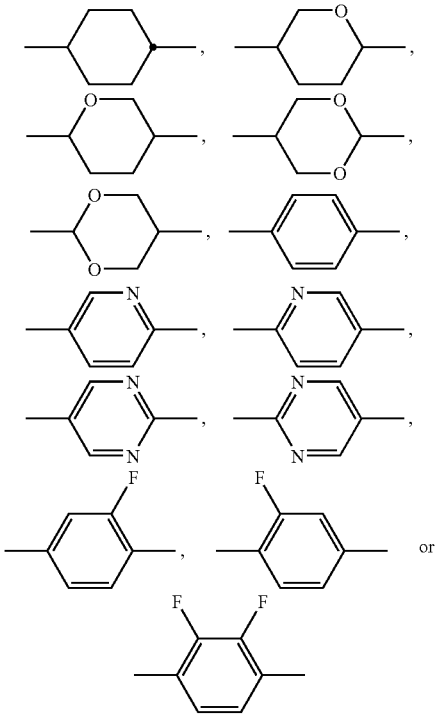

$Z^{11}$ and $Z^{12}$ if present each, independently of one another and, if $Z^{12}$ is present more than once, also these independently of one another, denote a single bond, —CO—O—, trans —CH═CH—, —CH═CF—, —CF═CH—, —CF═CF—, —CH═CH—CO—O—, —CF═CF—CO—O—, —CF═CH—CO—O—, —CH═CF—CO—O—, —CF$_2$—O—, —O—CF$_2$— or —C≡C—, $X^1$ denotes F, Cl, —OCF$_3$, —CF$_3$, —OCF$_2$H, CN, —C≡C—CN or NCS, and m denotes 0, 1 or 2.

17. A light-modulation element according to claim 1, wherein said liquid-crystalline modulation medium has an elastic constant $K_1$ of 14.0 pN-30.0 pN.

18. A light-modulation element according to claim 1, wherein said liquid-crystalline modulation medium has an elastic constant $K_1$ of 14.0 pN-30.0 pN, an elastic constant $K_2$ of 3.0 pN-18.0 pN 2.0 pN 20.0 pN, and an elastic constant $K_3$ of 8.0 pN-30.0 pN.

19. A light-modulation element according to claim 1, wherein the ratios of the elastic constants $K_2/K_3$ is 0.40 or more and the elastic constants $K_2/K_1$ is 0.10-1.0.

* * * * *

UNITED STATES PATENT AND TRADEMARK OFFICE
CERTIFICATE OF CORRECTION

PATENT NO. : 8,168,083 B2  Page 1 of 1
APPLICATION NO. : 12/677155
DATED : May 1, 2012
INVENTOR(S) : Mark Goebel et al.

It is certified that error appears in the above-identified patent and that said Letters Patent is hereby corrected as shown below:

In the Claims:

Column 80, line 58 (Claim 18), reads: "of 3.0 pN -18.0 pN 2.0 pN - 20.0 pN, and an elastic constant $K_3$" It should read: -- of 3.0 pN -18.0 pN, and an elastic constant $K_3$ --.

Signed and Sealed this
Thirty-first Day of July, 2012

David J. Kappos
*Director of the United States Patent and Trademark Office*